COMPOSITE VIDEO SYSTEM USING UNBLANKING VOLTAGE DEVELOPED FROM TRIGGERS BRACKETING THE VIDEO TRAIN

Filed Sept. 21, 1951

INVENTORS
R.W. LANDEE, H.T. HAYES, J.R. DEEN, T.J. JOHNSON.

BY Lyon & Lyon
ATTORNEYS

June 18, 1957 R. W. LANDEE ET AL 2,796,603

COMPOSITE VIDEO SYSTEM USING UNBLANKING VOLTAGE DEVELOPED FROM TRIGGERS BRACKETING THE VIDEO TRAIN

Filed Sept. 21, 1951 11 Sheets-Sheet 2

INVENTORS
R. W. LANDEE, H. T. HAYES, J. R. DEEH, T. J. JOHNSON.

BY Lyon & Lyon
ATTORNEYS

COMPOSITE VIDEO SYSTEM USING UNBLANKING VOLTAGE DEVELOPED FROM TRIGGERS BRACKETING THE VIDEO TRAIN

Filed Sept. 21, 1951 11 Sheets-Sheet 3

INVENTORS
R.W. LANDEE, H.T. HAYES, J.R. DEEN, T.J. JOHNSON.

BY Lyon & Lyon

ATTORNEYS

INVENTORS
R.W. LANDEE, H.T. HAYES, J.R. DEEN,
T. J. JOHNSON,
BY Lyon & Lyon
ATTORNEYS COMPOSITE VIDEO SYSTEM USING UNBLANKING VOLTAGE DEVELOPED FROM TRIGGERS BRACKETING THE VIDEO TRAIN Filed Sept. 21, 1951 11 Sheets-Sheet 5

INVENTORS
R. W. LANDEE, H. T. HAYES, J. R. DEEN,
T. J. JOHNSON,
BY Lyon & Lyon
ATTORNEYS June 18, 1957 R. W. LANDEE ET AL 2,796,603

COMPOSITE VIDEO SYSTEM USING UNBLANKING VOLTAGE DEVELOPED FROM TRIGGERS BRACKETING THE VIDEO TRAIN

Filed Sept. 21, 1951 11 Sheets-Sheet 6

INVENTORS
R.W. LANDEE, H.T. HAYES,
J.R. DEEN, T.J. JOHNSON.
BY
Lyon & Lyon
ATTORNEYS

INVENTORS
R. W. LANDEE, H. T. HAYES, J. R. DEEN,
T. J. JOHNSON.

BY Lyon & Lyon
ATTORNEYS

June 18, 1957 R. W. LANDEE ET AL 2,796,603

COMPOSITE VIDEO SYSTEM USING UNBLANKING VOLTAGE DEVELOPED FROM TRIGGERS BRACKETING THE VIDEO TRAIN

Filed Sept. 21, 1951 11 Sheets-Sheet 8

INVENTORS
R.W. LANDEE, H.T. HAYES, J.R. DEEN, T.J. JOHNSON,

BY Lyon & Lyon

ATTORNEYS

June 18, 1957 R. W. LANDEE ET AL 2,796,603

COMPOSITE VIDEO SYSTEM USING UNBLANKING VOLTAGE DEVELOPED FROM TRIGGERS BRACKETING THE VIDEO TRAIN

Filed Sept. 21, 1951 11 Sheets-Sheet 9

INVENTORS
R.W. LANDEE, H.T. HAYES, J.R. DEEN, T.J. JOHNSON.
BY
Lyon & Lyon
ATTORNEYS

INVENTORS
R.W. LANDEE, H.T. HAYES, J.R. DEEN,
T.J. JOHNSON.

BY Lyon & Lyon

ATTORNEYS.

COMPOSITE VIDEO SYSTEM USING UNBLANKING VOLTAGE DEVELOPED FROM TRIGGERS BRACKETING THE VIDEO TRAIN
Filed Sept. 21, 1951 11 Sheets-Sheet 11
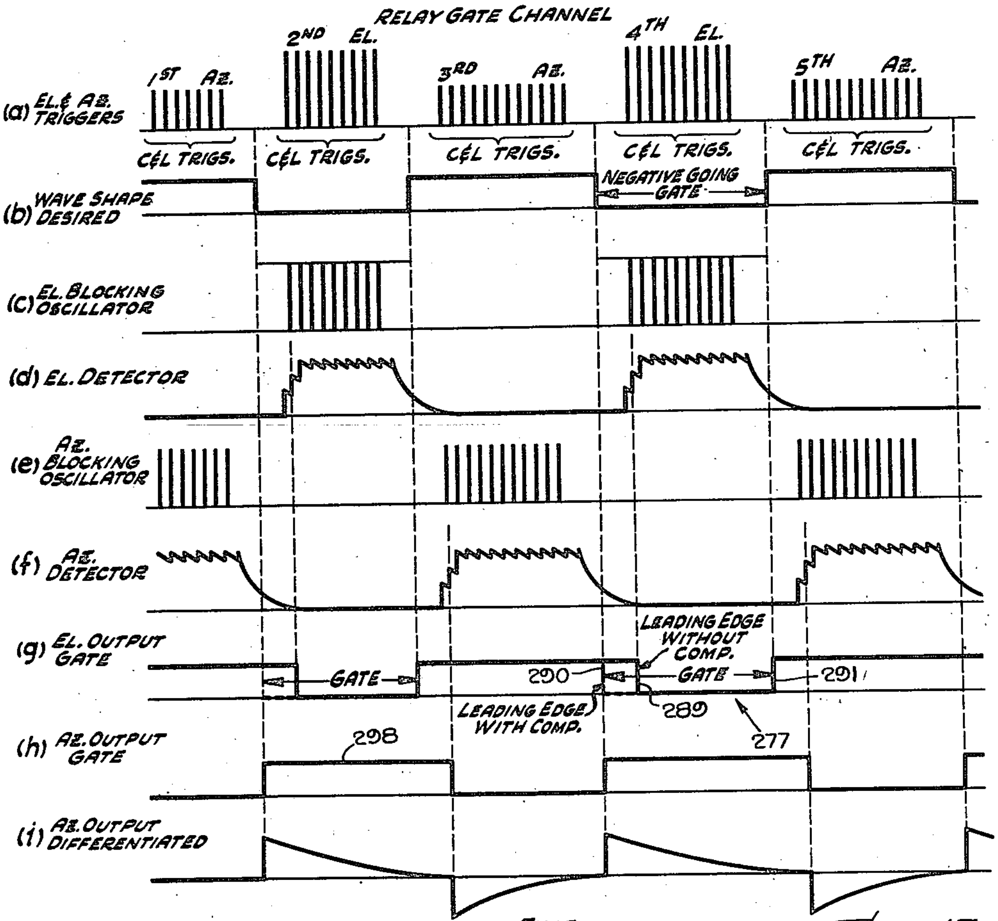
FIG. 15.
FIG. 19.
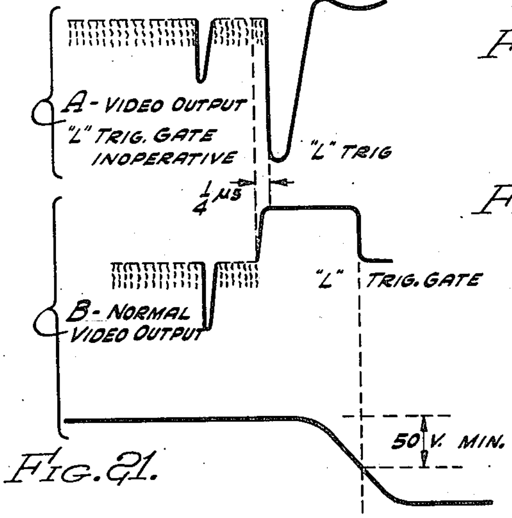
FIG. 21.
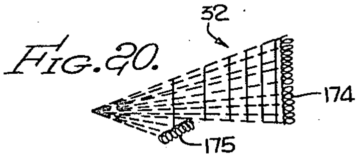
FIG. 20.
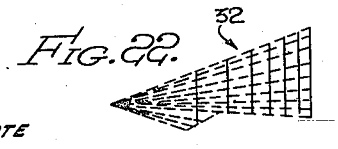
FIG. 22.
INVENTORS
R.W. LANDEE, H.T. HAYES, J.R. DEEN,
T.J. JOHNSON
BY Lyon & Lyon
ATTORNEYS.

United States Patent Office 2,796,603
Patented June 18, 1957

2,796,603

COMPOSITE VIDEO SYSTEM USING UNBLANKING VOLTAGE DEVELOPED FROM TRIGGERS BRACKETING THE VIDEO TRAIN

Robert W. Landee, Los Angeles, Harry T. Hayes, Long Beach, James R. Deen, Hollywood, and Thomas J. Johnson, Los Angeles, Calif., assignors to Gilfillan Bros., Inc., Los Angeles, Calif., a corporation of California Application September 21, 1951, Serial No. 247,616

17 Claims. (Cl. 343—11)

The present invention relates to improved techniques and means particularly useful in cathode ray tube indicators of the type such as found in the so-called precision section of G. C. A. (ground controlled approach) radar aircraft landing systems, but is of course not necessarily limited to use in such equipment.

In general, the invention contemplates improved means and techniques whereby all of the voltages applied to the intensity control electrode of a cathode ray tube are impressed so as to produce visible indications only during the duration of a gating voltage whereby voltages generated in the radar system, either internally or in accordance with external conditions, are prevented from producing visible indications. More specifically, the present invention contemplates what may be termed a gated video arrangement wherein all of the expectant and useful video for producing indications occur during the duration of a gating voltage.

Another aspect of the present invention resides in the fact that the duration of such gating voltage is automatically varied in accordance with the particular angular position of the cathode ray sweep (corresponding to the angular position of the radiated antenna beam) for purposes of producing pattern or display clipping or limiting, so that the viewing surface of the cathode ray tube may be used most efficiently. A further aspect of the present invention concerns itself with the application of other cathode beam intensifying voltages during the duration of such gating voltage, and such voltages as described herein may include related range marks, V-follower lines for indicating on the cathode ray tube the actual area scanned by the radiated antenna beam, as well as so-called electronic cursors for establishing electronically predetermined runway and glide path course lines.

An object of the present invention, therefore, is to provide improved apparatus and techniques whereby the aforementioned indicated results are obtained.

A specific object of the present invention is to provide an improved arrangement of this character which utilizes gated video.

Another specific object of the present invention is to provide an improved arrangement of this character particularly useful in producing so-called azimuth-elevation (Az.-El.) displays.

Another specific object of the present invention is to provide an improved system of this type which allows video, in composite form to be transmitted remotely in an improved manner.

Another specific object of the present invention is to provide an improved indicating system of the character described herein wherein all of the composite video signals intended to produce intensification of a cathode ray tube beam sweep are bracketed between a pair of so-called C and L triggers, such triggers being produced and used to generate a gate having a duration commensurate with the time spacing between such C and L triggers, and such gate serving to condition the cathode ray tube for intensification by such signals, such intensification beginning with a D trigger.

Another specific object of the present invention is to provide an improved indicating system of the type mentioned in the preceding paragraph, characterized by the fact that the cathode beam intensifying signals occur only in the time between C and L triggers and are prevented from being displayed in the interim between an L and a next succeeding C trigger.

Another specific object of the present invention is to provide an improved indicating system of the type mentioned in the two preceding paragraphs, characterized further by the fact that the C and L triggers are assured of appearing as a pair. In other words, there will never be a C trigger without an L trigger and vice versa.

Another specific object of the present invention is to provide an improved indicating system of the type described in the three preceding paragraphs, characterized further in that the related antenna serves to develop, in motion of the radiated antenna beam, an intensity unblanking gate which is inter-related with the gate produced by the C and L triggers in such a manner that the cathode beam-intensifying signals are not made visible unless such unblanking gate is present and contemporaneous with C and L trigger-produced gate.

Another specific object of the present invention is to provide an improved system of this character featured by the fact that the composite video train includes (1) echo signals, (2) cursor pulses for establishing electronically the glide path course line in the elevation versus range display, and for also developing the runway course line in the azimuth versus range display, and (3) range marks amplitude modulated to convey certain V-follower information, such composite video train being developed for producing a visible display either at a local station or at a remotely located station.

Another specific object of the present invention is to provide an improved indicating system of the type described in the preceding paragraph, characterized by the fact that the components of the composite video train mentioned in such paragraph are bracketed between a pair of so-called C and L triggers which themselves are amplitude modulated in accordance with the particular display, i. e., azimuth or elevation, being produced, so that such amplitude modulated C and L triggers may be used at the remote station to develop a so-called relay gate functioning to shift the sweep centers $O_1$ and $O_2$ (Figure 1) recurrently after completion of the azimuth and elevation displays.

Another specific object of the present invention is to provide an improved indicating system of the type mentioned in the two preceding paragraphs, characterized further by the fact that means are provided for developing and introducing into the composite video train, after the appearance of the L trigger, a pair of so-called reference and data triggers of variable time spacing, the particular time spacing between such reference and data triggers serving as a measure of the angular position of the azimuth or elevation antenna beam, as the case may be for purposes of causing the cathode ray beam sweeps at the remote location to effectively pivot about the origins $O_1$ and $O_2$ in the development of the elevation and azimuth displays.

Another specific object of the present invention is to provide an improved indicating system of this character in which the composite video train bracketed by the C and L triggers is rendered invisible unless the cathode ray sweep generating means is operative to generate a cathode ray sweep, and unless a pair of C and L triggers is present.

Another object of the present invention relates specifically to the transfer of a composite video train together with the reference and data triggers to a remotely located installation which may, for example, be as much as two miles from the local installation. The spacing of the reference and data triggers added or mixed with the composite video train prior to transmission, serves as a measure of the angular position of the azimuth or elevation antenna beam which at that particular instance is scanning through space. This pair of reference and data triggers is used at the remote installation after being converted into the azimuth or elevation beam angle voltage, as the case may be, for modulating the cathode beam sweep circuits in the same manner as at the local installation.

Another object of the present invention, therefore, resides in providing means at the local installation or station for generating a composite train of signals of the type shown in Figure 11 herein, and transmitting such train of signals to a remotely located installation or station at which means are present for separating the various components of such train of signals, and utilizing the same for producing azimuth-elevation representations or displays on the same face of a cathode ray tube.

Another specific object of the present invention is to provide an improved system of this character which incorporates means at the remote installation or station for generating a relatively long relay gate, of time duration commensurate with the time required for presentation of the azimuth display, in accordance with the amplitude modulation on the C and L triggers.

Another specific object of the present invention is to provide an improved system of this character which incorporates improved means for separating the component signals of the composite video train at the remote installation or station.

Another specific object of the present invention is to provide an improved remoting system of this character which incorporates relatively simple means for adding or mixing the pair of reference and data triggers to the composite video train prior to transmission to the remote installation or station.

Another specific object of the present invention is to provide an improved system of this character which incorporates means for eliminating the effect of electrostatic and/or electromagnetic pickup on the transmission line extending from the local station to the remote station, together with means for separating the various triggers, pulses and echo signals.

Another specific object of the present invention is to provide an improved system of this character in which the C and L triggers are used not only to develop a relatively long relay gate commensurate with the time required for developing the azimuth representation or display, but which also utilizes such C and L triggers to separate the reference and data triggers from the composite video train in such a manner that the reference and data trigger integrating beam angle voltage is rendered insensitive to the other triggers, pulses and signals on the composite video train.

Another object of the present invention is to provide an improved system having the features indicated in the preceding paragraph, and which further utilizes the C and L triggers to gate the transfer of echo signals to a cathode beam intensification electrode of the cathode ray tube.

In certain aspects, the present invention relates to equipment and techniques for developing V-follower information of the character described in United States Letters Patent 2,583,644 of Alwin S. Kelsey, Alvin L. Hiebert, Homer G. Tasker and William E. Osborne, assigned to the same assignee as the present application. In general, this V-follower information serves to indicate visually the elevational position of the azimuth antenna in the elevation cathode ray tube display, and conversely, to show the azimuthal position of the elevation antenna in the azimuth cathode ray tube display. Such V-follower information is developed by modulating the range mark voltages generated in a related range mark generator, such modulation being effective either to further intensify the range marks on the cathode ray tube screen or, in the alternative, to deintensify such range marks even to the point where predetermined portions of the range marks, otherwise visible, are rendered invisible.

Another specific object of the present invention is to provide an improved V-follower system of this character.

Another specific object of the present invention is to provide an improved V-follower system of this character which provides, directly upon the cathode ray tube indicator tube of the radar system scanning in one coordinate, a continuous indication of the limits of the angular field in that coordinate which is being covered by the second radar system scanning in another coordinate.

Another specific object of the present invention is to provide an improved V-follower system of this character featured by the fact that the range marks produced by a related range mark generator are modulated, i. e., either further intensified or de-intensified, as desired, for conveying the desired V-follower information.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
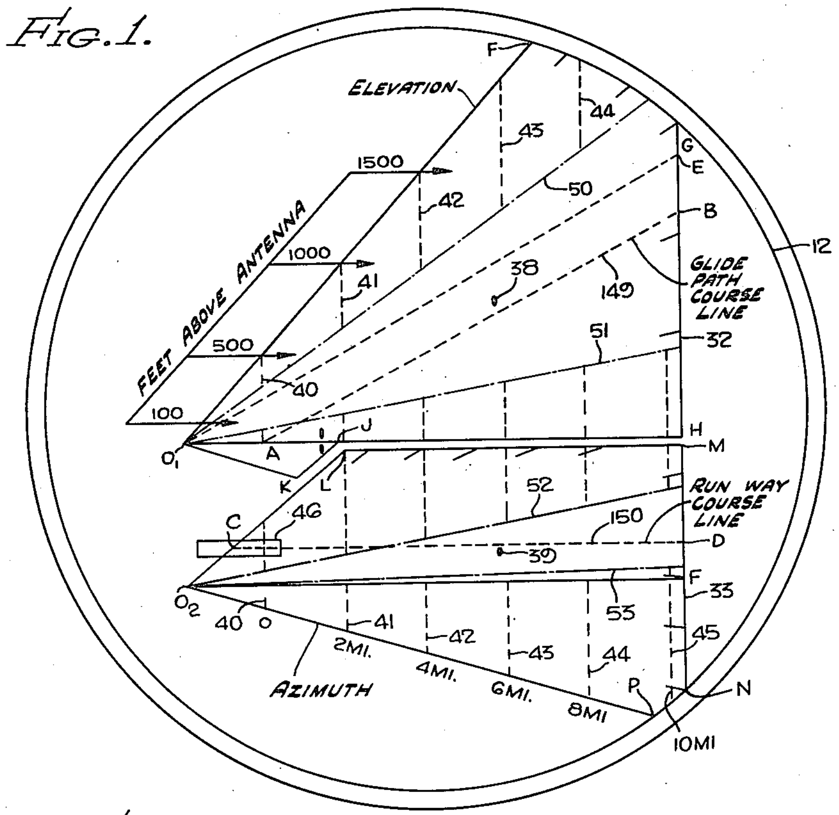
Figure 1 shows both an azimuth versus range and an elevation versus range, i. e., a so-called Az.–El. display on the viewing surface of a cathode ray tube, the range marks, spaced at equal time intervals, being intensity modulated in accordance with features of the present invention for conveying V-follower information.
Figure 9:
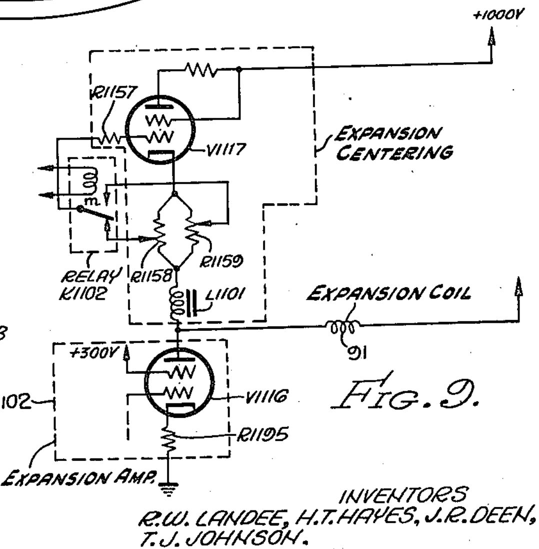
Figures 2, 5, 6, 13A:
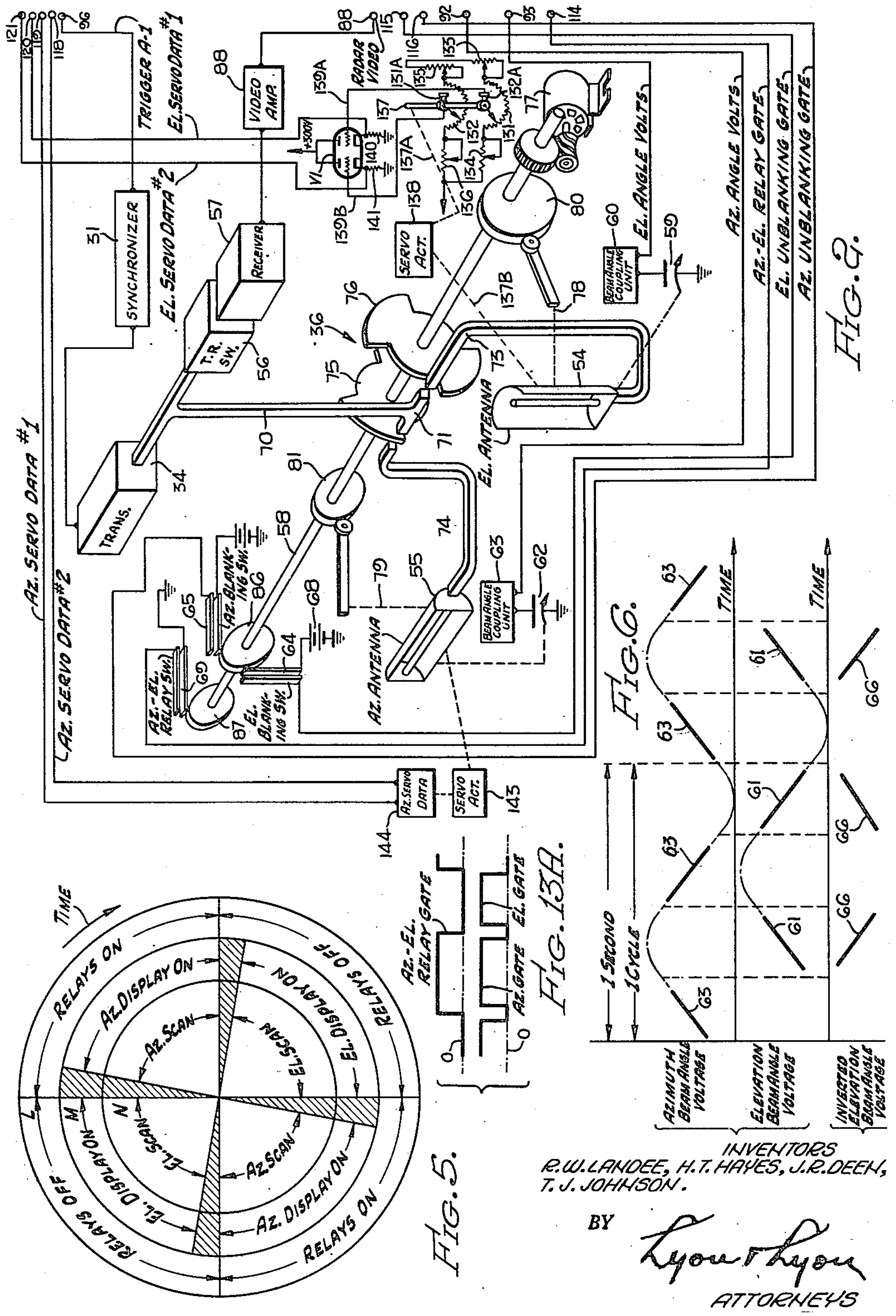
Figure 2 shows in schematic form antenna beam scanning apparatus and related switches and other apparatus controlled thereby.
Figure 3:
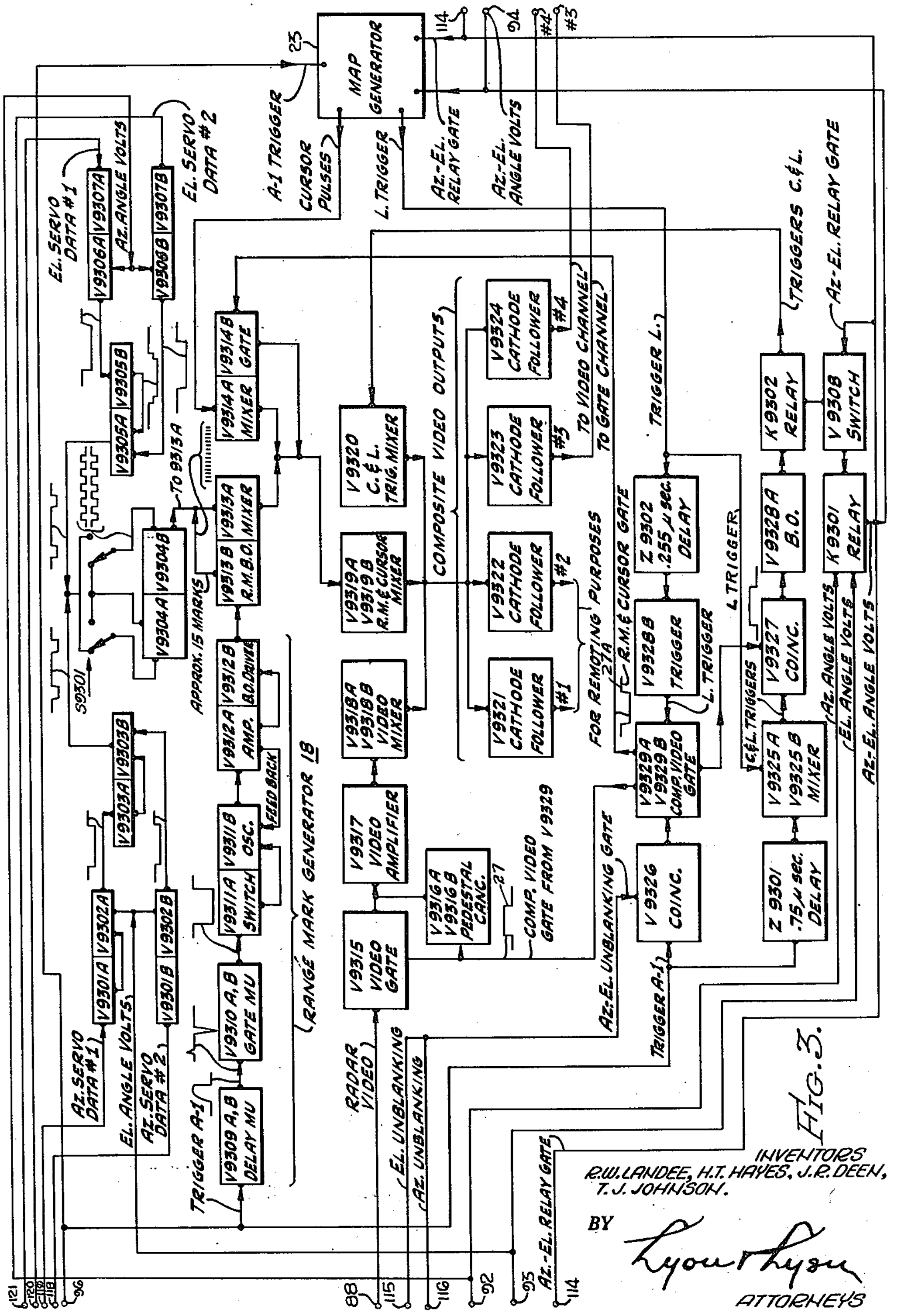
Figure 3 is a block diagram of apparatus intended to be connected to correspondingly designated terminals in Figure 1.
Figure 4:
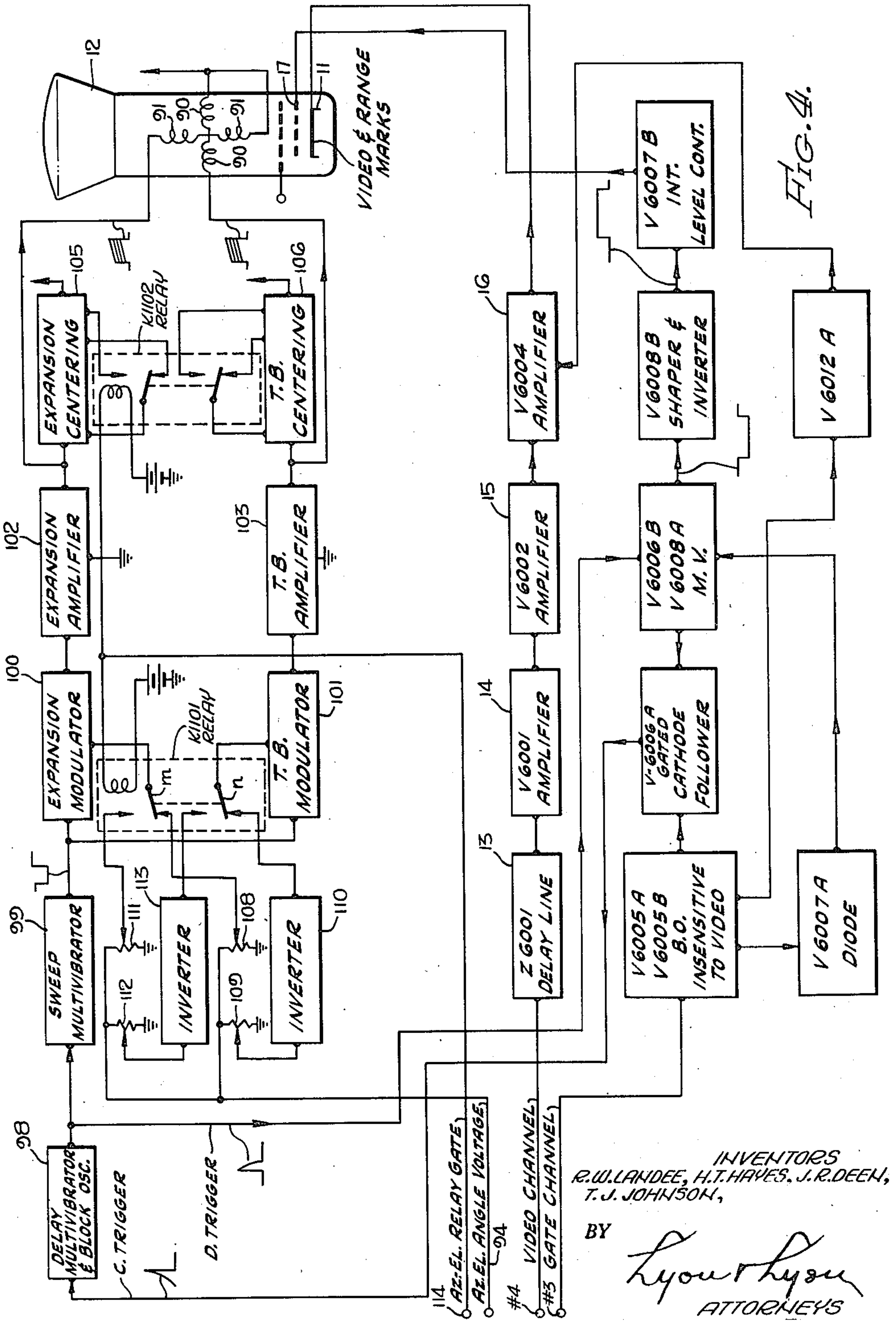
Figure 4 shows in block diagram certain apparatus connected to correspondingly designated terminals in Figure 3.
Figures 7, 23:
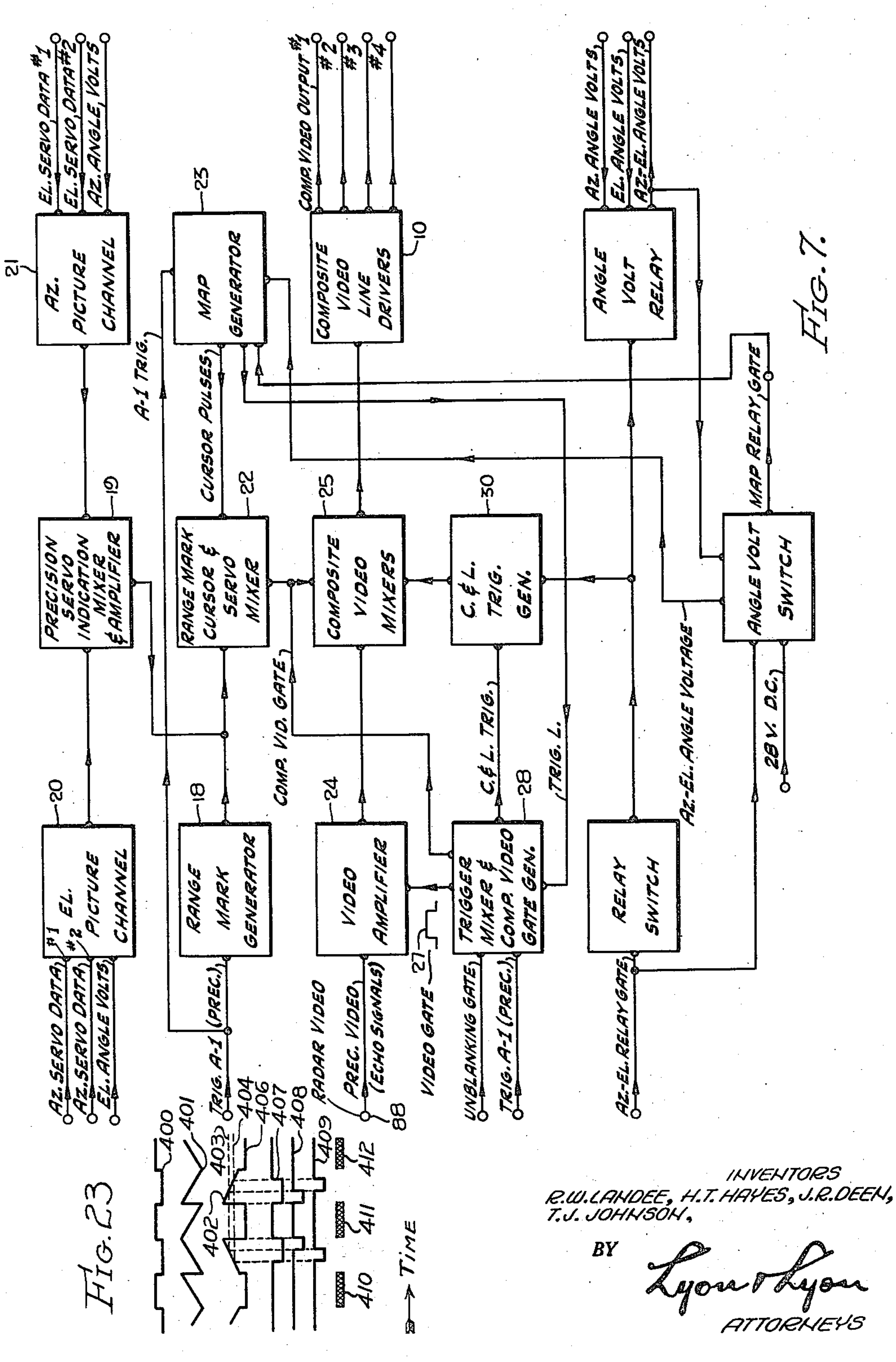
Figure 8:
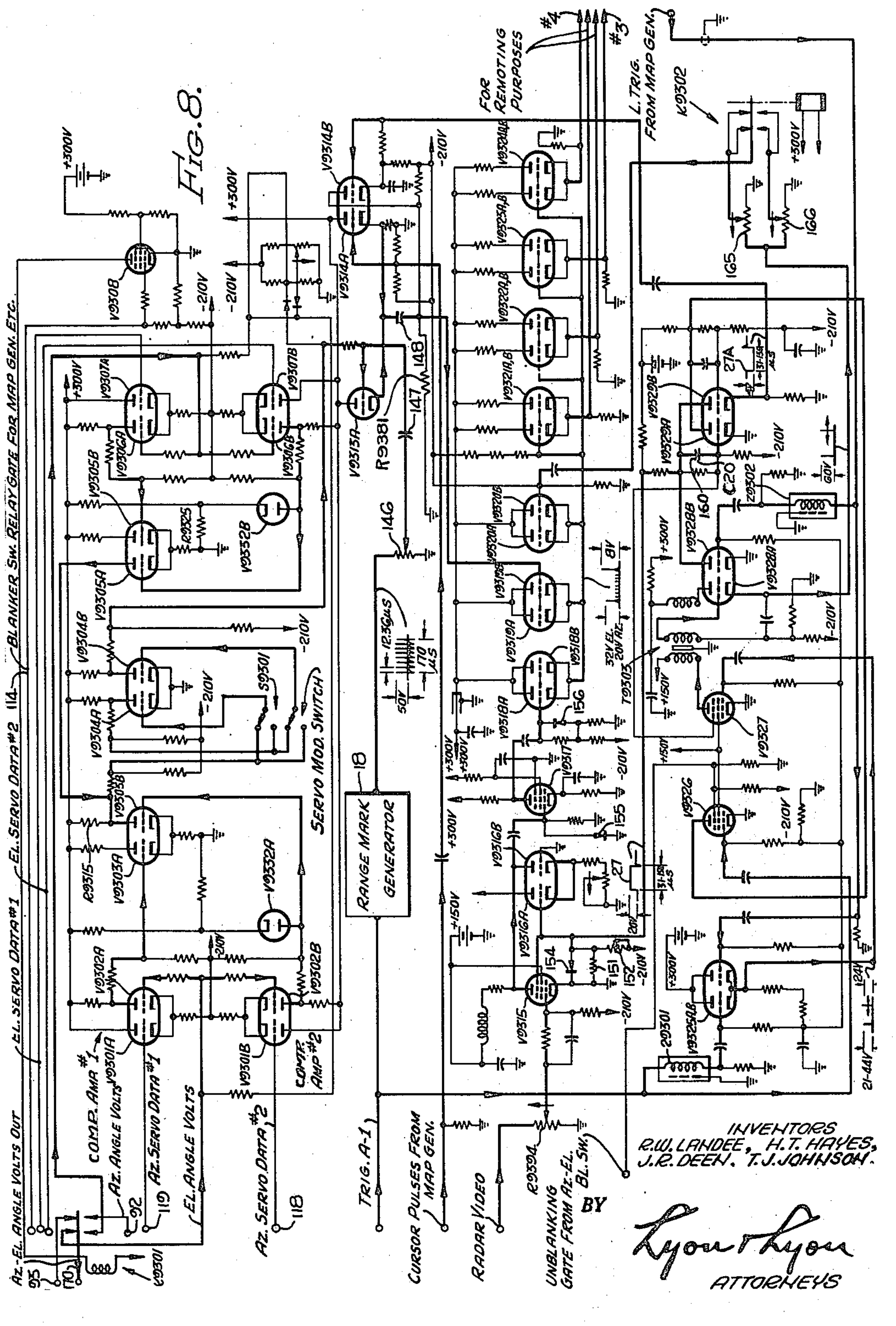
Figures 10, 18:
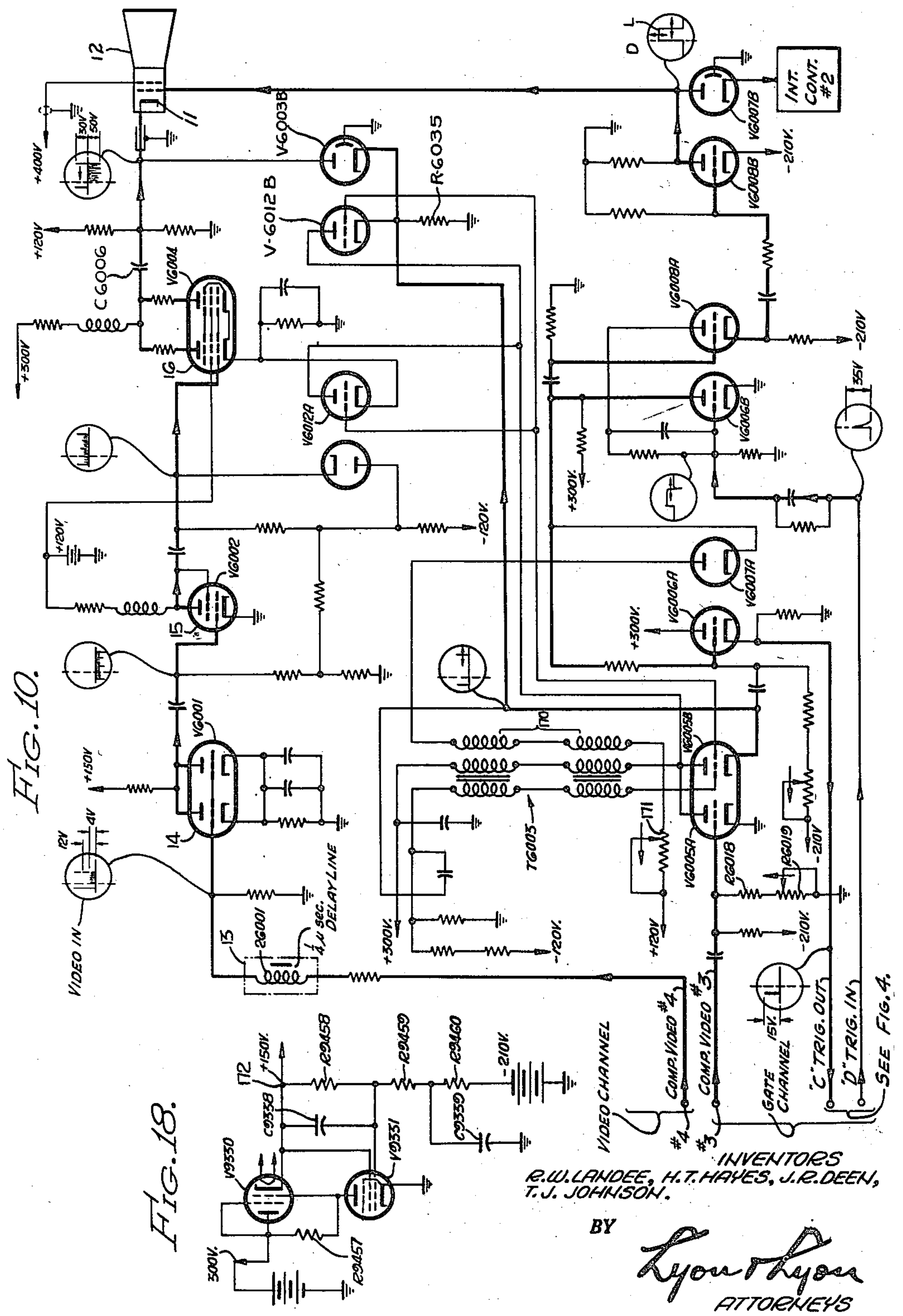
Figure 11:
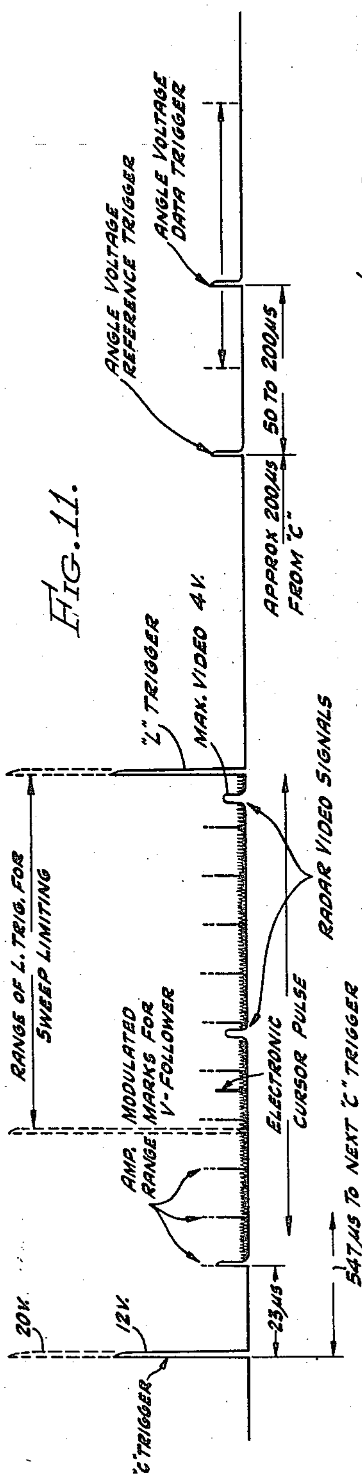
Figure 12:
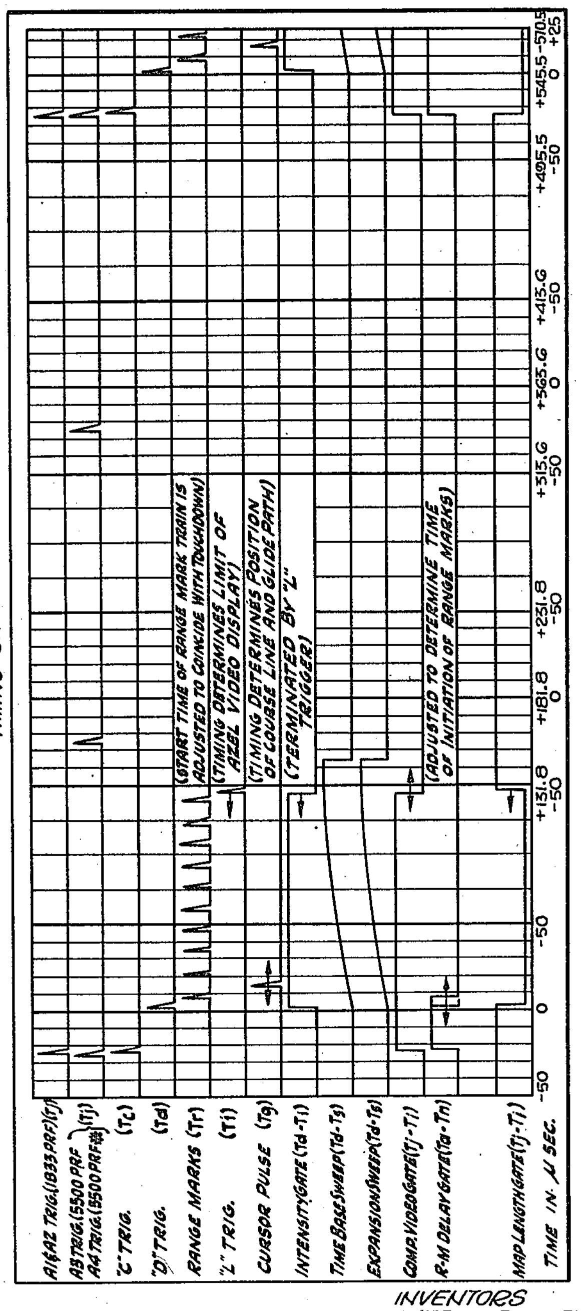

Figure 5 serves to represent the cyclical variation of azimuth and elevation beam angle scanning periods, operation of the relays and corresponding times in which the cathode ray tube is being used to develop either the elevation or azimuth display, as the case may be, on a time sharing basis;

Figure 6 shows the cyclical variation of azimuth and elevation beam angle voltages in relationship to the related position of the corresponding radiated azimuth and elevation antenna beams, such variation being preferably linear and being obtained in the corresponding beam angle coupling units shown in Figure 2 for use in developing V-follower information in accordance with features of the present invention;

Figure 7 shows in more simplified form apparatus indicated in block form in Figure 3;

Figure 8 shows in more detailed form the specific circuitry of elements indicated in block form in Figures 3 and 7;

Figure 9 shows a centering circuit for cyclically varying the origin of the radial sweeps, namely, the points $O_1$ and $O_2$ in Figure 1;

Figure 10 is a schematic representation showing in more detailed form some of the apparatus indicated in block form in Figure 4;

Figure 11 shows the time relationship between various triggers, range marks, cursor pulses and echo signals developed by the apparatus described herein;

Figure 12 shows in somewhat more detailed form the time relationship of other triggers, range marks, pulses, gate and sweeps generated by the apparatus shown in the previous figures, it being noted that such time relationships are shown on a logarithmic scale, and as shown are useful in providing a logarithmic type of display of the character.

Figure 16:
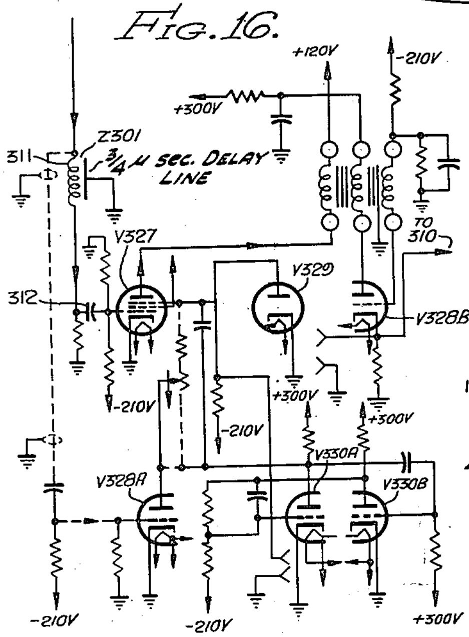
Figure 13:
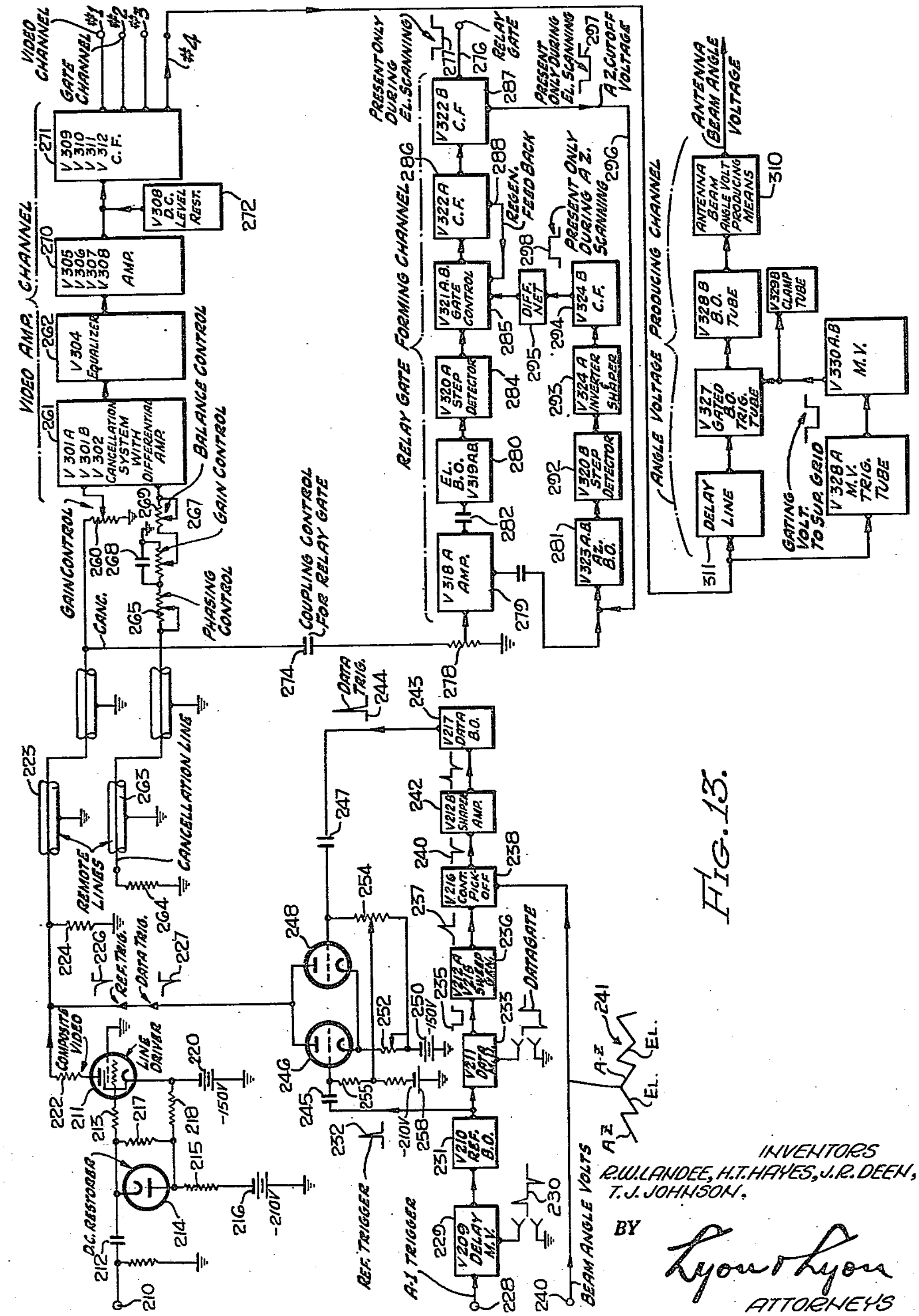
Figure 14:
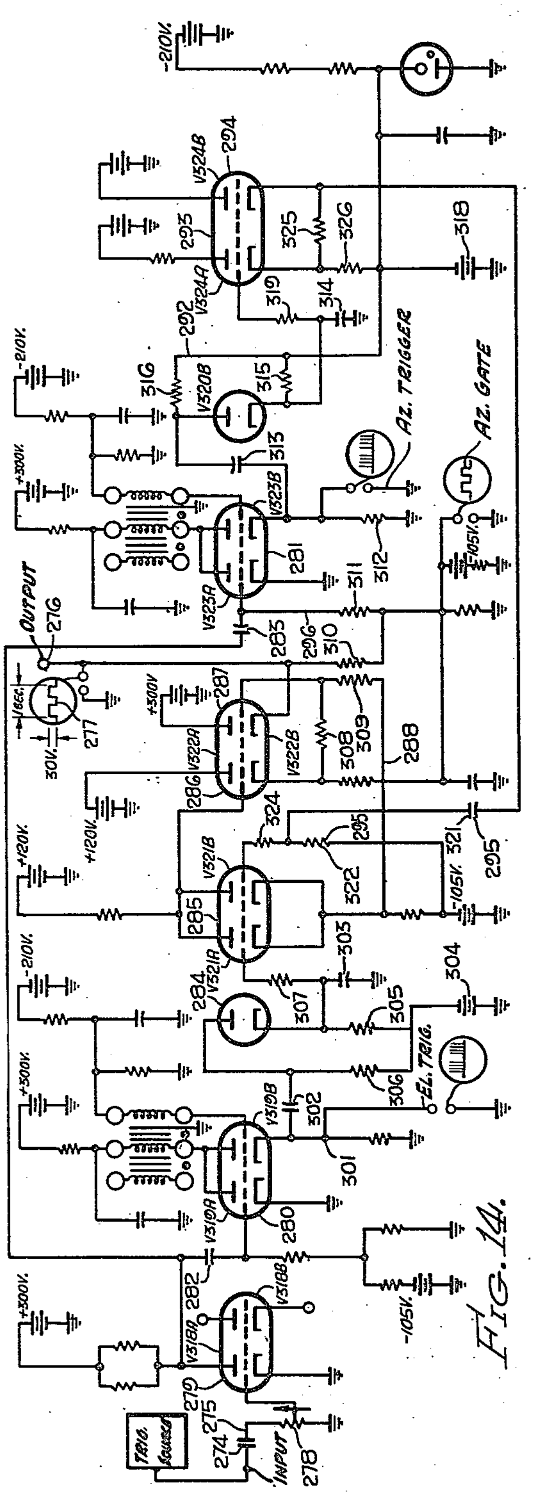
Figure 17:
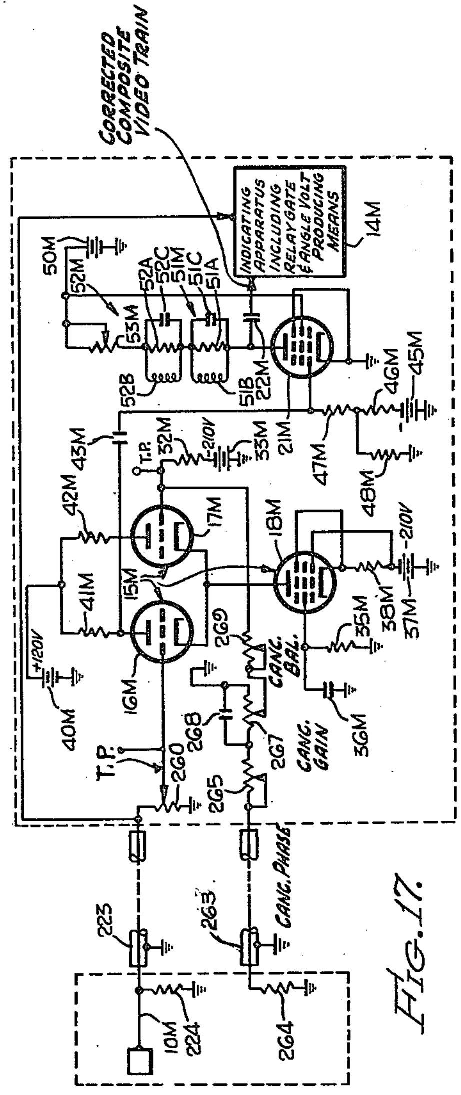

Figure 13 shows circuitry useful in producing the display of Figure 1 at a remote location and comprises an alternate arrangement intended to have the various designed terminals shown therein connected on the one hand to correspondingly designated terminals in Figure 3 and, on the other hand, to correspondingly designated terminals in Figure 4;

Figure 13A illustrates the sequential development of the azimuth and elevation unblanking voltages in relationship to the relay gating voltage as developed by the apparatus shown in Figure 2;

Figure 14 is a schematic representation showing in more detailed form some of the circuitry of the relay gate forming channel which is shown in block diagram in Figure 13;

Figure 15 shows a series of triggers and wave forms which are present in different portions of the circuit shown in Figures 13 and 14;

Figure 16 shows in more detailed form circuitry in the angle voltage producing channel shown in block diagram in Figure 13, and in particular the specific means whereby the reference and data triggers are separated at the remote location from the composite video train;

Figure 17 shows in more detailed form some of the circuitry shown in block diagram in Figure 13 useful in remoting the composite video train over an extended transmission line;

Figure 18 shows a voltage regulating circuit for compensating for load changes and serves essentially to maintain a voltage of 150 volts derived from a 300-volt source, the regulating circuit functioning to produce compensatory effects for load changes;

Figure 19 represents a portion of the composite video train near and at the time of appearance of the L trigger when features of the present arrangement are not incorporated;

Figure 20 serves to show the resulting "blooming" at the outline of the display, either azimuth or elevation, when the video train shown in Figure 19 is used;

Figure 21 represents the same condition as shown in Figure 19 but with features of the present invention utilized;

Figure 22 represents the absence of "blooming" in the displays when the video output developed as shown in Figure 21 is utilized.

Figure 23 shows in graphic form related variations of various voltages appearing in the system illustrated in Figures 3, 7 and 8.

In general, the system described herein serves to produce visible indications in cathode ray tube displays which are shown in Figure 1. In Figure 1 it is observed that there are actually two displays, an elevation display on the upper portion and azimuth display on the lower portion of the C. R. T. Both of these displays are produced electronically using a single electron gun structure operating on a time sharing basis. The present invention relates particularly to the manner in which the composite video is applied to a cathode beam intensity control electrode, i. e., the control grid or the cathode, for purposes of obtaining visible indications in the displays.

This composite video includes, as shown in Figure 11: (1) The returning radar echo signals; (2) the range marks which are essentially aligned vertical lines in the azimuth and elevation displays; (3) intelligence in the form of amplitude modulation on the range marks for developing so-called V-follower lines in both azimuth and elevation displays, the V-follower lines in the azimuth display in Figure 1 serving to indicate the position in azimuth of the elevation antenna, and conversely the V-follower lines in the elevation display serving to indicate the position in elevation of the azimuth antenna; and (4) cursor pulses for producing electronically the predetermined safe glide path course line in the elevation display and the corresponding runway course line in the azimuth display. It is noted that this aforementioned train of information, i. e., composite video train, in the form of signals and pulses, is bracketed between so-called C and L triggers.

Briefly, as described in greater detail hereinafter, the C trigger is used to initiate the start of a gating voltage, and the L trigger terminates such gating voltage. Such gating voltage is applied to an intensity control electrode, i. e., the grid of the cathode tube, so as to condition or allow the cathode tube to produce visible indications in accordance with the various voltages which comprise the composite video. In other words, it is intended that the components of the composite video should be insufficient in themselves to produce visible indications on the cathode ray tube viewing surface, but requires the presence of such gating voltage on the first anode of the cathode tube for producing visible indications; this gating voltage being derived from information in the composite video train, namely the C and L triggers.

It is observed that the composite video signals shown in Figure 11 do not, as such, include a designation of the V-follower voltages for producing the aforementioned V-follower lines, since such V-follower voltages are used in the present system to modulate, i. e., either to intensify or alternatively to de-intensify range marks.

It is evident that other periodically appearing voltages may be included in the composite video which is in the form of a train of signals having a length or time duration measured by the spacing between the C and L triggers, and therefore the present invention in its application is not limited specifically to voltages for producing the specific information described herein, but finds application in other systems wherein the composite video may include other intelligence denoting voltages or pulses. One of the important features of the present invention is that such composite video train is applied and effective to produce visible indications only during the duration of an established gating voltage. This gating voltage may be of constant duration for each cathode beam sweep, or may, as described herein, be of varying duration for purposes of obtaining tailored azimuth and elevation displays whereby most efficient use may be made of the cathode ray tube viewing surface.

While Figure 11 shows the composite video train in relationship to the C and L triggers, their relationship to other pulses or voltages in the complete radar system is shown in Figure 12. In Figure 12 the so-called A1 trigger is the system trigger and is the one generated in synchronizer 31 (Figure 2). The A1 trigger causes operation of the transmitter 34 and resulting antenna beam from the azimuth antenna or elevation antenna, as the case may be, depending upon the particular position of the radio frequency switch 36. The C trigger appears after the A1 trigger with a very small time delay. The C trigger is applied to the cathode beam sweep generating means for purposes of initiating a cathode beam sweep and serves to initiate the D trigger, as indicated in Figure 4. For remote control purposes, the amplitude of the C trigger is 12 volts when the azimuth display is being produced, and is 20 volts when the elevation display is being produced.

While the series of range marks are initiated by the A1 trigger, they are adjustable along the time base axis as a unit, so that the first range mark occurs after the D trigger, and such first range mark corresponds to the aircraft touchdown point in either the azimuth or elevation display, as the case may be. The range mark generator for accomplishing such adjustability may be of the type described and claimed in the copending application of Korelich, Serial No. 211,513, filed February 17, 1951, and assigned to the same assignee as the present invention.

The L trigger is initiated by the C trigger but occurs with variable time delay after the C trigger, as indicated by the arrow on the L trigger in Figure 12, for purposes of limiting, clipping or tailoring the Az.-El. display. The L trigger is produced in the map generator (Figure 7), the circuitry and techniques involved in the same being shown and claimed in the copending application of Raymond B. Tasker et al., Serial No. 222,512, filed April 23, 1951, and assigned to the same assignee as the present invention. As alluded to before, the L trigger determines when the intensity gating voltage applied to the control grid is stopped. The amplitude of the L trigger is the same as the amplitude of the C trigger during the azimuth and elevation presentations.

While, for purposes of describing certain aspects of the present invention, the C and L triggers may have the same amplitude during the presentations of both the elevation and azimuth displays, they are shown as being modulated in amplitude to indicated the manner in which the present system described herein is adapted for the transmission of the video information to a remote location in accordance with an alternative arrangement described herein in connection with Figure 13. When the present system is connected for remote operation, information as to the angular position of the radiated antenna beam is conveyed to such remote location in the form of a pair of triggers, i. e., a so-called reference trigger and a data trigger, and such reference and data triggers shown in Figure 11 are included herein for reference purposes and are utilized in the apparatus described in connection with the alternative arrangement shown in connection with Figure 13.

The apparatus for producing the composite video train of signals shown in Figure 11 includes means for generating the various intelligence denoting voltages and mixing the same so that they may be applied jointly between the C and L triggers to the cathode of the cathode ray tube. A portion of this apparatus is shown generally in block diagram in Figure 7. In Figure 7 the composite video train appears in the so-called composite video line drivers which have four output terminals. Terminals labeled No. 1 and No. 2 are used for remoting purposes. The terminal No. 4, as shown in Figure 4, is coupled to the cathode 11 of the cathode ray tube 12 through a delay line 13 and amplifiers 14, 15, 16, while the output appearing on terminal No. 3 is applied to a network or gate channel indicated also in Figure 4 and shown in more detail in Figure 10 for separating the C and L triggers from the composite video train, and utilizing the same to form a gating voltage which is instituted by the D trigger and terminated by the L trigger, such gating voltage being applied to the grid 17 of the tube for purposes mentioned previously.

The range marks are produced in the range mark generator 18 in Figure 7, and are initiated by the A1 triggers, i. e., the radar system trigger. The output of the range mark generator 18, however, is modulated, i. e., either upward or downward in amplitude in accordance with voltages developed in the servo indication mixer and amplifier stage 19. Azimuth servo data and elevation servo data applied respectively to the elevation picture channel 20 and azimuth picture channel 21 are alternatively supplied on a time sharing basis to such mixer and amplifier stage for producing the aforementioned modulation. Elevation and azimuth angle voltages are applied to the elevation and azimuth picture channels 20, 21, respectively, for developing the modulation component, so that such modulation component varies in accordance with the angular position of the radiated azimuth or elevation antenna beam, as the case may be, in the manner described later. The range marks thus modulated are applied to the range mark cursor and servo mixer 22, to which is applied cursor pulses developed in the map generator 23. It is noted that these cursor pulses are used to produce the glidepath and runway course lines.

The returning radar echo signals applied to the video amplifier 24 in Figure 7 are amplified therein and applied to the composite video mixer stage 25, together with the output from the range mark and servo mixer stage 22. It is observed that the video amplifier 24 is a gated one and is supplied for that purpose with positive gates 27 developed in the trigger mixer and composite video gate generator stage 28, the input to which includes the system A1 trigger and unblanking gate described later, as well as an L trigger from the map generator stage 23. The stage 28 serves to generate the C trigger, and the C and L triggers are applied to the C and L trigger generator stage 30, which is also supplied with either azimuth or elevation beam angle voltage, as the case may be, on a time sharing basis. The output of the C and L trigger generator stage 30 is applied to the composite video mixer 25, and the output of the composite video mixer is applied to the composite video line driver stage 10.

More specifiicaly, the apparatus described herein serves to produce the elevation display 32 and azimuth display 33 in Figure 1 with the predetermined safe glidepath represented by the line AB in the elevation display 32, produced electronically as a series of dashes, and to correspondingly produce electronically the runway line in the azimuth display 33 represented by the line CD. This is for the general purpose of allowing an observer to "track" the course of an aircraft appearing as the dots 38, 39 on the elevation and azimuth displays, respectively, with reference to such corresponding lines AB and CD.

It is noted that these displays 32, 33 are produced by radial cathode ray beam sweeps originating from the adjusted electrical centers $O_1$, $O_2$ of the cathode beam deflecting system. The series of vertically aligned lines 40, 41, 42, 43, 44 and 45 in both displays 32, 33 represent range lines, i. e., the locus of points of constant distance from the centers $O_1$ and $O_2$, as the case may be. The range line 40 passes through the aircraft touchdown point A on the elevation display, and of course through the small rectangular tab 46 which may be placed on the face of the cathode ray tube to indicate the position of the aircraft landing strip in the azimuth display. The line 40 in displays 32 and 33 thus represents zero distance from touchdown. The lines 41, 42, 43, 44 and 45 represent, respectively, distances two miles, four miles, six miles, eight miles and ten miles from the corresponding touchdown point in the azimuth and elevation displays 33, 32.

It will be observed that the elevation display 32 and azimuth display 33 are irregular in shape, and such irregularities in the displays are produced by pattern limiting or clipping so as to allow more efficient use of the viewing surface of the tube and to allow the most important portions of the displays 32, 33 to lie closer to each other. For purposes of reference, the elevation display comprises the area defined by $O_1$, F, G, H, J, K, $O_1$. Similarly, for purposes of reference, the azimuth display 33 is confined in the area defined by $O_2$, L, M, N, P, $O_2$. The pair of radially extending lines 50, 51 in the elevation display are well known so-called V-follower lines, and while they do not appear as such on either display, are defined by intensity discontinuities in the range marks. Similarly, the pair of radially extending V-follower lines 52 and 53 in the azimuth display 33 indicates the area scanned by the elevation antenna, and are likewise defined by "obliterating" selected portions of the range marks, i. e., the range marks are "modulated" in accordance with V-follower information to produce discontinuities in the range marks to thereby effectively define such V-follower lines.

The apparatus for producing the displays 32 and 33 is first described in connection with Figures 2, 3 and 4 which have correspondingly designated terminals interconnected to produce a system for producing the display shown in Figure 1 locally.

*Pattern producing means*

In Figure 2 the synchronizer 31 serves to generate timing pulses which are used to time the operation of pulses applied to the transmitter 33 to initiate its operation. The transmitter stage 34, pulsed at a constant repetition rate of, for example, 5,500 pulses per second, consists of, for example, a magnetron oscillator with a characteristic frequency of about 10,000 megacycles. The output of this transmitter stage 34 is transferred to either the elevation (El.) antenna 54 of azimuth (Az.) antenna 55, depending upon the position of the motor driven interrupter or radio frequency switch 36. The transmit-receive (T–R) switch 56 prevents power from the transmitter 34 from being applied directly to the receiver 57. This transmit-receive switch 35, as is well known in the art, allows low intensity signals such as a train of resulting echo signals received on the antennas 54, 55 to be transferred to the input terminals of the receiver 57.

This diversion of energy from the transmitter 34 to the antennas 54, 55, accomplished by operation of switch 36, occurs at a rate of approximately 2 per second, so that in effect the combined antennas obtain 4 "looks" per second of the space scanned. The resulting antenna beams are caused to move angularly, i. e., to scan upon rotation of the shaft 58. The switch 36 is rotated twice per second, and while energy is being transmitted to one of the antennas 54, 55, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, for "Bridge Type Precision Antenna Structure," which depends for its operation on the use of a variable wave guide type of antenna. This particular means, per se, forms no part of the present invention, and, so far as the aspects of the present invention are concerned, the antenna scanning beam may be produced by moving the entire antenna through a relatively small arc of a circle. Actually, in fact, the azimuth antenna beam may scan first in one direction and then in the other, waiting after each scan while the elevation beam completes a scan in elevation.

While in any position during the part of the cycle in which the R. F. switch 36 allows the flow of energy to the elevation antenna 54, the elevation antenna beam is electrically scanned in elevation. The angular position of the elevation antenna beam is measured by means of a variable capacitor 59, one plate of which is attached to the beam scanner of elevation antenna 54 and varied in accordance therewith, such capacitor 59 comprising one part of a capacitative potentiometer contained in the angle coupling unit 60, which may be of the type described and claimed in the copending patent application of George B. Crane, Serial No. 212,114, filed February 21, 1951. The angle coupling unit 60 thus used with angle capacitor 59 is useful in developing the elevation beam angle voltage represented as 61 in Figure 6.

Similarly, the angle in azimuth of the azimuth antenna beam is measured by the angle capacitor 62 in azimuth angle coupling unit 63, operating synchronously with the scanner of the azimuth antenna 55. Such variation in azimuth angle voltage as a function of the particular angular position of the antenna beam is represented by the cyclically varying voltage 63 shown in Figure 6. It is observed that these voltage variations 61 and 63 have portions thereof shown in heavy lines, and it is these portions which are used to effect control operations, and which are selected by means mentioned later.

Figure 6 also shows, for purposes of reference, inverted useful elevation beam angle voltage as represented by the oblique lines 66.

Also coupled to the scanner of the elevation antenna 54 is the elevation unblanking switch 64, which has one of its terminals connected to the continuous voltage source 68, for purposes of developing an elevation unblanking voltage or gate so timed that its positive value corresponds to the time of effective scanning of the elevation antenna beam. The unblanking switch 65 is similarly coupled to the scanner of azimuth antenna 55, with one of its terminals connected to the continuous voltage source 68 for purposes of developing unblanking voltages so timed that the positive portions of such voltage correspond to the time of effective scanning of the azimuth antenna beam. Relay switch 69 operates at substantially the same time as switch 65, and synchronously therewith serves to generate the co-called Az.-El. relay voltage or gate (Figure 13A) which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, as seen in Figure 13A.

Figure 5 shows a schematic diagram of the time relations involved in a scanning cycle, which typically occupies a time in the order of one second. Forward progress of time is represented by clockwise motion about this diagram. The central circular region of Figure 5, marked N, shows the time schedule of the scanning operations of the two systems, opposite quadrants representing complete scans by the same system but carried out in opposite directions. The shaded areas (each comprising roughly 10° of the complete 360° cycle) represent the periods during which the transmitter 34 is switched by the switch 36 in Figure 2 from one antenna to the other. Unshaded areas of region N represent the time periods during which one or the other of the antennas is in use, sending out radio frequency pulses and receiving reflected echo signals from objects within the field of coverage of the beam. Shaded areas indicate inactive periods during which switching takes place, both antennas being momentarily isolated from the transmitter and receiver.

The inner annular region M of Figure 5 represents the time schedule of the related azimuth and elevation displays, subject, however, to pattern clipping described later, and corresponds to the cyclical variations of azimuth and elevation voltages represented in Figure 6.

The outer annular region of Figure 5, marked L, shows the time schedule of currents through the various coils of a number of so-called Az.-El. switching relays for effecting time sharing. The relay actuating current is obtained by the switch 69 (Figure 2) operating in synchronism with the mechanism producing azimuth antenna beam scanning.

More specifically, in Figure 2, the wave guide transmission line 70 leads from the transmitter 34 and receiving system 56, 57. A T-joint 71 divides this transmission line into two branches 73 and 74, leading through switch assembly 36 to the elevation and azimuth assemblies 54, 55, respectively. These branches have suitably placed shutter slots which receive the rotating shutters 75 and 76, respectively. These are mounted on the common drive shaft 58, driven by the motor 77, and have two blades each arranged in opposite fashion, so that when one antenna transmission branch is opened, the other will be blocked by its shutter. The shutter blades cover angles of approximately 100°, leaving openings of 80° as required by region N of Figure 5.

The same drive shaft 58 operates the two antenna beam scanning mechanisms, represented by the dotted lines 78, 79, and assumed to be of the construction in the above mentioned Allebach application and built into the antenna assemblies. In the showing of Figure 2, the eccentric cams 80, 81 on shaft 58 operate the beam scanning mechanism. Since each of the cams 80, 81 has one lobe, while its associated shutter 76 or 75 has two lobes, one opening in the shutter will find the antenna scanning in one direction, the other in the other direction. The azimuth and elevation blanking switches 65 and 64 are shown schematically in Figure 2 as cam actuated, being operated by the two-lobed cam 86, for purposes of establishing the unblanking or intensifying voltages represented in Figure 13A.

The Az.-El. relay switch 69 is operated by the cam 87 on shaft 58 to control current to the circuit switching relays, the function of which is described hereinafter.

The radar echo signal, when received at the elevation antenna 54 or the azimuth antenna 55, is fed back through the R. F. switch 36 and passed through the tune-receive switch 56 into the receiver 77. Receiver 57 serves to detect the video, and after the video is amplified in the video amplifier stage 88 it is applied to the correspondingly designated terminal 88 in either Figure 3 or 7. Such video, i. e., radar video, derived from echo signals is mixed with other information in a composite video train, as mentioned previously in connection with Figure 11, and that portion of the video train between the C and L triggers is applied to the cathode 11 of the cathode ray tube 12 (Figure 4).

The cathode ray tube 12 in Figure 4 has a pair of magnetic deflection coils 90, 91, so arranged as to deflect the associated electron beam substantially parallel to two mutually perpendicular axes, the so-called "time base" axis which is generally, although not exactly, horizontal as viewed by the operator and as shown in Figure 1, and the so-called "expansion" axis which is generally vertical. In general, each basic A1 trigger pulse developed in synchronizer 31 (Figure 2) is made to initiate a current wave of sawtooth form through the time base deflection coil 90, and a current wave of similar form through the associated expansion deflection coil 91, the current in each coil expanding approximately linearly with time and then returning rapidly to zero. Instead of a linear variation, this variation may be logarithmic in character, as described in the above mentioned copending patent application of Homer G. Tasker et al., Serial No. 175,168, filed July 21, 1950, and assigned to the same assignee as the present application.

The repetition rate of such sawtooth currents is, of course, the same as or a fractional multiple of the pulse repetition rate of the transmitted pulses, and occurs during the expectant period of resulting echo signals. It will be understood that electrostatic deflection of the cathode ray beam may be used instead of electromagnetic deflection, appropriate modifications being made in other parts of the equipment.

Such sawtooth currents applied to the deflection coils 90, 91, however, are "modulated" at a slow rate by currents of much lower perodicity which are produced by voltages, i. e., the beam angle voltages which are produced in accordance with the scanning movement of the antenna beam, and which are shown graphically in heavy lines in Figure 6. Those portions of the voltage indicated in heavy lines in Figure 6 only are used to modulate the sweep voltages on a time sharing basis.

These voltages, as represented by the curves 61 and 63, may vary from plus two volts at one extreme of the scanning range to plus fifty-two volts at the other end. These particular antenna beam angle voltages, as mentioned previously, are used in effect to "modulate" the amplitude of the sawtooth voltage waves developed in the sweep amplifier shown in Figure 4 and applied at a much higher repetition rate to the expansion coil 91, for purposes of obtaining unidirectional or unidimensional magnification in the cathode ray display in accordance with principles set forth in the copending patent application of Homer G. Tasker, Serial No. 680,604, filed July 1, 1946, and assigned to the same assignee as the present application. On the other hand, the amplitude of the sawtooth voltage waves developed in the sweep amplifier and applied to the other quadraturely acting time base coil 90 is likewise modulated to a much smaller degree and in a different manner, for purposes of orientation as described later.

Thus, the amplitude of the currents supplied to coil 91 is automatically varied in accordance with antenna beam angle voltage, so that the angle which any particular cathode ray beam makes, corresponds, on an expanded scale, to the antenna beam angle.

The tube 12 is rendered fully operative for producing visible indications only when a suitable intensifying voltage is applied to its grid 17, bringing the tube approximately to cut-off condition. A relatively small additional video signal applied to the cathode 11 then strengthens the cathode beam, making it momentarily visible on the screen as a dot, the position of which is determined by the currents flowing at that particular moment in the set of deflection coils 90, 91.

For purposes of developing the aforementioned suitable deflecting currents in the cathode ray deflection coils 90 and 91, the sweep generating circuit shown in Figure 4 is supplied with C triggers which appear in timed relationship and as a result of A1 triggers developed in synchronizer 31 (Figure 2). Such C triggers are applied in Figure 4 to the delay multivibrator and blocking oscillator stage 98, the output of which is fed to the sweep generating multivibrator stage 99. A negative gating voltage is generated in the stage 99 and fed to the expansion and time base modulator stages 100 and 101, respectively, and from them in modulated form through expansion and time base amplifiers 102 and 103. The output of amplifiers 102 and 103, in the form of essentially trapezoidal waves of appropriate amplitude, are applied to the expansion deflection coil 91 and the time base deflection coil 90, respectively, causing current pulses of linear sawtooth form in the coils. Expansion and time base centering circuits 105 and 106 are also connected to the deflection coils. The modulator stages 100 and 101, for purposes of modulation, receive Az.-El. antenna beam angle voltages via switches *m* and *n*, respectively, of relay K1101.

With the relay unactuated (as shown) the elevation beam angle voltage appearing on the potentiometer resistance 108 is applied through switch *m* to the expansion modulator 100; and through potentiometer resistance 109 and inverter 110 and switch *n* to the time base modulator 101. After completion of the elevation scan, relay K1101 is actuated by switch 69 (Figure 2) breaking the elevation beam angle voltage connections just described, and connecting the azimuth beam angle voltage through potentiometer 111 and switch *m* to the expansion modulator 100; and through potentiometer 112, inverter 113 and switch *n* to the time base modulator 101.

Thus, the degree of modulation of sweep current, and hence the degree of angle expansion of the display, may be separately regulated for the azimuth display by adjustment of the potentiometer 111, and for the elevation display by adjustment of potentiometer 108; and the degree of modulation of the time base sweep current, and hence the apparent angle between the range marks and the time base, may be separately regulated for the azimuth display by adjustment of potentiometer 112, and for the elevation display by adjustment of the potentiometer 109.

The centering circuits 105 and 106 in Figure 4 are individually capable of two separate adjustments, one effective when relay K1102 is actuated (azimuth display) and one when the relay is unactuated (elevation display) to determine the positions of the points $O_2$ and $O_1$, respectively in Figure 1. Thus, the origins of azimuth and elevation displays are separately adjustable, the centering circuits automatically responding to one or other set of adjustments according to the energized condition of relay K1102. A schematic diagram showing a centering circuit for this purpose is shown in Figure 9.

The deflection coil 91 in Figure 9 is connected between a 700-volt positive supply and two parallel circuits, one leading to ground through tube V1116, which is the final stage of expansion amplifier 102, and the other leading through choke coil L1101 and centering tube V1117 to a 1000-volt positive supply. The first of these two circuits feeds to deflection coil 91, the periodically varying sweep producing component, while the second circuit provides a relatively constant but adjustable centering current component. The cathode resistor of centering tube V1117 is made up of two parallel connected potentiometers R1158 and R1159, the movable contacts of which are connected respectively to the normally closed and normally open contacts of switch *m* or relay K1102. A switch arm is connected through grid resistor R1157 to the tube grid. The grid bias, and hence the centering current through the tube and through the coil 91 thus depends upon the position of relay switch *m* and is determined by the setting of potentiometer R1159 when relay K1102 is actuated (azimuth display) and by the setting of potentiometer R1158 when the relay is not actuated (elevation display). The two displays are therefore separately edjustable as to their vertical position (expansion component) on the indicator tube by means of the two potentiometers.

Time base deflection coil 67 is provided with centering circuitry which is identical to that in Figure 9 and functions in a like manner, controlled by switch *n* of relay K1102. In fact, by appropriate changes of the numerals and lettering, Figure 9 may be considered to illustrate the time base centering circuit. The potentiometers then provide separate adjustments of the elevation and azimuth displays with respect to their horizontal positions (time base component).

Now that the apparatus for presenting the display has been described, a more detailed description of the apparatus and technique whereby the composite video train is produced and applied to the cathode of the cathode ray tube and whereby the patterns are clipped or tailored so that they assume the particular configuration shown in Figure 1 is now described in detail.

*Formation of composite video train*

The manner in which the composite video train is produced is alluded to above with reference to the previous description of Figure 7. For the following detailed explanation reference is made at this time not only to Figure 7 but also to Figures 3 and 8, as well as Figure 2 which discloses means for developing V-follower information, i. e., azimuth and elevation servo data. It is noted that Figure 3 is a block diagram, while Figure 8 shows the same apparatus as indicated in block diagram in Figure 3, and that the various tubes, delay lines and relays in Figures 3 and 8 have the same characteristic reference numerals; for example, the block in Figure 3 having the label V-9301A is applicable to the same designated tube in Figure 8. The range mark generator 18 serves to generate range marks in timed relationship with the A1 triggers applied thereto, and this range mark generator may be of the character described and claimed in the aforementioned copending application of Korelich.

The amplitude of the range marks is either increased or decreased, i. e., modulated, in accordance with the position of the servo modulation switch S-9301 in Figures 3 and 8. By this means discontinuities are produced in the range marks to thereby effectively establish the V-follower lines 50, 51, 52 and 53 (Figure 1) in the displays. These lines, of course, are not visible as such in the manner indicated in Figure 1, but such V-follower lines are shown in Figure 1 for more clearly illustrating certain operational features.

The V-follower information for modulating the range marks is developed in conventional manner, as for example, by the manner described and claimed in U. S. Letters Patent 2,483,644, Kelsey et al., patented October 4, 1949, a portion of which apparatus is shown in Figure 2. In Figure 2 the azimuth and elevation servo data is developed on the leads designated Az. servo data No. 1, Az. servo data No. 2, El. servo data No. 1 and El. servo data No. 2, such leads terminating at terminals 119, 118, 121 and 120, respectively.

Referring now to the schematic diagram in Figure 2, the V-follower voltages for use in the elevation display are obtained from two linearly wound rotary arm potentiometers 131, 132, whose arms are adjustably linked together as by the common shaft 137, and are linked to the antenna beam scanning mechanism as indicated schematically at 138, which controls the azimuth adjustment of the elevation antenna 54. The latter linkage, which may be of any suitable type, mechanical or otherwise, is indicated in Figure 2 by a dashed line 137A. Similar linkage between the elevation antenna 54 and the mechanism 138 is indicated by the dashed line 137B. The potentiometer strips 131 and 132 are connected in parallel as shown between a positive and a negative portion of the voltage and have the variable resistances 133, 134 and 135, 136 in series with them, by which the exact voltage range of each potentiometer may readily be controlled.

For each position of the azimuth adjustment of the elevation antenna, the V-follower voltages taken off the movable contacts of the potentiometer have definite values, the difference between them remaining constant. Each V-follower voltage determines directly the angle on the azimuth display of the corresponding V-follower data. Thus, the constant difference between the two V-follower voltages determines the fixed angle between the V-follower "lines" 50, 51 on the indicator tube in Figure 1. As the elevation antenna is rotated to vary its azimuthal position, the entire V rotates correspondingly as a unit about its vortex or origin $O_1$ on the screen. The angle between the V-follower "lines" 50, 51 and the relationship of each line to the azimuth angle of the elevation antenna may readily be adjusted, for example, by loosening set screws 131A and 132A, securing the potentiometer arms to shaft 137, rotating the arms through the required angle, and again tightening the set screws. Or the same adjustment may be accomplished by shifting the potentiometer cap to higher or lower potentials by manipulation of variable resistances 133, 134 and 135, 136. It is assumed, for the present description, that the arms are so adjusted that the take-off voltage of the potentiometer 131 is more positive than that of 132.

The V-follower voltages, obtained as just described, at the movable contacts of potentiometers 131 and 132 are compared by means of the circuitry in Figure 2, with the azimuth angle coupling voltage applied to the two tubes V-9306A and V-9306B (Figures 3 and 8). As the latter periodically becomes less positive during a given scanning cycle of the azimuth antenna, the relationship between the angle coupling voltage and first one and then the other of the V-follower voltages passes through a particular condition, as will be described, and causes generation of voltages which are used to modulate, i. e., either intensify or de-intensify the range marks, as the case may be. More specifically, the two V-follower voltages are applied by leads 139A and 139B, respectively, to the grids of both sections of the cathode follower coupling tube V1, thus controlling the currents through these two sections and the voltage drops in their cathode resistors 140 and 141. Potentials of the two cathodes of tube V1 are thus determined and are used to control the circuitry shown in Figures 3 and 8.

While Figure 2 describes in detail only the arrangement for developing the elevation servo data, it is evident that the same apparatus may be duplicated and used for purposes of developing the azimuth servo data in the same manner. The azimuth servo actuator for that purpose has the reference numeral 143 (corresponding to servo actuator 138), and the corresponding azimuth servo data circuitry has the reference numeral 144 (corresponding to the circuit including potentiometer 131, 132).

The servo data modulation circuit shown in Figures 3 and 8 makes it possible to show the beam angle position of the azimuth antenna, in elevation, on the elevation portion of the display, and to show the beam angle position of the elevation antenna, in azimuth, on the azimuth portion of the display. This information is displayed by the intensification or deintensification (at the operator's option) of the range marks over the scanning area of the particular portion of the display sector affected. For this purpose, servo data No. 1 and No. 2, when properly adjusted, vary over the same voltage range as the angle voltage (50 volts) but are displaced in absolute value by a few volts when adjusted for proper display information (for example, 5–55 instead of 2–52). Voltage differences between the two leads No. 1 and No. 2, either azimuth or elevation, as the case may be, remain fixed as the corresponding antenna is servoed. Servo data No. 1 is adjusted to have a lower potential than servo data No. 2, and both values increase, as mentioned previously, as the servo angle of the antenna increases in a direction corresponding to the increase in angle voltage. For example, as the elevation antenna scans upwardly, elevation angle voltage from the elevation angle voltage generator increases; as the azimuth antenna is servoed upwardly, both azimuth servo data voltages increase.

The azimuth servo data lead No. 1 is coupled to the grid of tube V–9301A. This tube is the first half of a comparator, and the current drawn by its cathode places the commonly coupled cathode of the second half of V–9302A at a level approximately two volts higher than the existing potential of servo data No. 1 lead. By this means V–9302A is held at the cut-off point until the value of the elevation angle voltage applied to its grid reaches a level close to the voltage present on the first grid (this level being the "cut-off" value for the tube) at which point the tube conducts. The elevation angle voltage increases in a positive direction as scanning action takes place from minus one degree upwardly, and decreases when the scanning direction is reversed; the limits of angle voltage amplitude are established to be plus two volts to plus fifty-two volts. The resultant wave form at the anode of tube V–9302A is a negative gate which starts at the instant the tube conducts (the two voltages, azimuth servo data voltage No. 1 and elevation angle voltage, are then approximately equal) and continues until the particular scan period is completed. The action of comparator No. 2 is similar to that described for previously described amplifier No. 1. Servo data No. 2 applied to terminal 118 (Figure 8) is applied to the grid of tube V–9301B, causing the tube to conduct. The current drawn through the cathode of tube V–9301B places the commonly coupled cathode of tube V–9302B at a potential slightly higher than the servo data voltage. The action in this case is identical to the action described for differential amplifier No. 1 with the tube remaining below the point of conduction until the elevation antenna angle voltage applied to the grid of tube V–9302B approaches the cathode potential and forms a gate on the anode of tube V–9302B.

This gate is negative and, when scanning, is in a direction representing increasing angle voltage, and always occurs later than the negative gate from differential amplifier No. 1. When the antenna scans in the reverse direction the action is similar, but the order of appearance of the two gates is reversed. The output of comparator No. 1 is applied to the first half of differential amplifier No. 3, tube V–9303A. The appearance of the negative gate lowers the common cathode potential to a point that allows normally non-conducting tube V–9303B to conduct, causing a negative gate to appear on its anode. This gate conducts until the negative gate from tube V–9302B appears at the grid of tube V–9303B to again bias it below the point necessary for conduction. The level of the gate from tube V–9302B is clamped at approximately plus ten volts by action of a unidirectional conducting device such as the tube V–9332A to assure that in the absence of gates at the grids of V–9303, V–9303A will be conducting and V–9303B non-conducting. The resultant gate has a width determined by the potential difference between voltages on the azimuth servo data No. 1 and azimuth servo data No. 2 leads; the starting point is determined by the time at which the elevation angle voltage approximately equals the potential of the azimuth servo data No. 1 lead, and the terminating point is determined by the time at which the elevation angle voltage approximately equals the potential of the servo data No. 2 lead.

The elevation servo data leads No. 1 and No. 2 are connected in similar manner to the circuitry which includes the tubes V–9306A and B, V–9307A and B, V–9305A and B and V–9304B for accomplishing the same type of result in the azimuth display. Thus, gates are formed at the anode of tube V–9305A as a result of modulation of the azimuth antenna angle voltage by the elevation servo data appearing on elevation servo data leads No. 1 and No. 2. The outputs of the two circuits are paralleled by using the common load plate resistor R–9315 for the gating tubes V–9303B and V–9305A. This is possible due to the fact that the gates formed by the angle voltages and servo voltages from the different antennas do not overlap in time.

The combined output thus developed is applied to terminals of the "Servo modulator switch" S–9301, which, depending upon the position of the same, causes either an intensification or a deintensification of the range marks. In the deintensifying position of switch S–9301, the output of the switch is applied to the grid of the inverter tube V–9304A. The plate output of this tube is fed through the switch to the grid of the modulator tube V–9304B. The output from the anode of the modulator is a negative gate which is applied to the grid of mixer tube V–9313A. In the intensifying position of switch S–9301, the inverter tube V–9304A is by-passed out of the circuit and the modulating gates are applied directly to the grid of modulator tube V–9304B, its plate output then in such case being positive and applied in similar manner to the control grid of tube V–9313A.

It is thus observed that the range marks developed in range mark generator 18 and applied through the amplitude controlling potentiometer 146 and condenser 147 are mixed on the grid of tube V–9313A with the aforementioned V-follower information in either an additive or a subtractive manner. The voltage thus developed on the cathode of the mixer tube V–9313A is a measure of both the intensity of the range marks and the intensity of the V-follower information, and is applied from the cathode of tube V–9313A through coupling condenser 148 to the control grid of the mixer tubes V–9319A, B.

The map generator 23 (Figure 7) is identical with that one shown and claimed in the copending patent application of Green et al., Serial No. 222,511, filed April 23, 1951, and assigned to the same assignee, and serves to develop two types of pulses, namely, cursor pulses and L triggers. The cursor pulses are used in such pending application and herein to produce electronically and visually the predetermined safe glidepath 149 (Figure 1) in the elevation display and the runway course line 150 in the azimuth display. The line 149 corresponds to the line AB, and the line 150 corresponds to the line CD. The L trigger is used in such copending application and herein for display limiting or tailoring, as well as for other purposes herein. While the output from the map generator 23 comprises cursor pulses and L triggers, the input to the map generator comprises, on the one hand, the relatively slow varying azimuth-elevation angle voltage and, on the other hand, the A1 system trigger. These cursor pulses developed in the map generator are applied to the mixer stage 22 in Figure 7, details of which are more clearly illustrated in Figures 3 and 8.

Cursor pulses from the map generator 23 in Figure 3 are delivered to the grid of the cathode follower tube V–9314A, the cathode of which is in parallel with the cathode of mixer tube V–9313A. The output from both of these cathodes is sent to the range mark mixer tubes V–9319A and V–9319B.

The output of the mixer stage 22 (Figure 7) is applied to the composite video mixer 25, to which is likewise applied the radar video output from the video amplifier 24.

The video amplifier stage 24 is now described in detail.

With reference to the following description of the video amplifier, it should be noted that the viedo amplifier 24 is effective as a passive network only during the duration of the video gate 27 (Figure 7) developed in and applied to the video amplifier from the video gate generator stage 28.

The radar video, in the form of echo signals, is applied to the amplitude controlling potentiometer R–9394. The video is applied from such potentiometer R–9394 to the control grid of gating amplifier V–9315. The suppressor grid of this tube is normally biased below the cut-off point of the tube by voltage from the voltage divider circuit which comprises in part resistances 151, 152. A gate is received from the flip-flop circuit comprising tubes V–9329A and V–9329B. The start of this gate, a video sampling gate, is coincident with the A1 trigger, and its trailing edge occurs approximately one-quarter of a microsecond after the arrival of the L trigger developed in the map generator. Crystal 154 establishes the level of the suppressor grid of tube V–9315 and the control grid of tube V–9316A at ground potential for the duration of this gate.

All video appearing on the grid of tube V–9315 is amplified and reproduced in the anode circuit during the time the video sampling gate 27 is present. During the gate interval the anode voltage of tube V–9315 drops, due to the higher current flowing at that time through the tube. This voltage drop is cancelled by the action of the pedestal canceller tubes V–9316A and V–9316B, which apply a positive gate of opposite polarity and of the same amplitude to the output. The pedestal canceller circuit, including tubes V–9316A, B, serves to establish a predetermined voltage level during the duration of the video sampling gate. The tube V–9317 amplifies the video signal and applies the same to the grids of the parallelled video mixer tubes V–9318A and V–9318B, which reproduce the video in their common cathode circuit. Crystals 155 and 156 serve as D. C. restorers. The manner in which the video sampling gate 27 is obtained is described in detail hereinafter, it being sufficient for the present purposes to note that a sampled portion of the radar video only has its effect on the control grids of tubes V–9318A, B, which have their cathodes connected to the cathodes of similar mixing tubes V–9319A, B.

The other tubes V–9320A, B, having their cathodes connected to the cathodes of the aforementioned tubes V–9318A, B and V–9319A, B, serve as a mixer for the C and L triggers. Thus, range mark pulses, modulated servo data, i. e., V-follower information, from the cathode mixer tube V–9313A and mixed with cursor pulses from the cathode of tube V–9314A are applied to the parallelled grids of range mark mixer tubes V–9319A, B. These grids are maintained at a cut-off level until the appearance of a positive gate from the anode of gating tube V–9314B, which is essentially the video sampling gate described above for purposes of changing the bias on the suppressor grid of tube V–9315. The range mark mixer stage operates only for the duration of this gate. C and L triggers from the switches of relay K–9302 are applied to the control grids of tubes V–9320A, B. The winding of relay K–9302 is energized only during the azimuth scanning period, the relay gate developed by the switch 69 shown in Figure 2 being used for that purpose.

In other words, as will be more evident later, the C and L triggers, comprising a pair of triggers, have a certain amplitude during the time the elevation display is being developed, and such pair of triggers is caused to have a different amplitude during the time the azimuth display is being developed, all for the purpose of developing relay gates, in the manner set forth hereinafter, when, as in the second alternative arrangement shown herein, the apparatus is used for remoting purposes. When the apparatus is intended to produce a display in proximity to the radar apparatus, the pairs of C and L triggers during both the azimuth and elevation scanning periods may have the same amplitude instead of different amplitudes as described herein. Thus, the composite video train now comprising the C trigger, the radar video, range marks modulated in amplitude in accordance with V-follower information, cursor pulses and L triggers, is applied to four separate cathode follower stages which include tubes V–9321A and B, V–9322A and B, V–9323A and B, and V–9324A and B. These four tubes have been mentioned previously, and serve in general to feed the composite video train to the precision video amplifiers and to the precision remote line driver. Each video output is terminated with a 2,200-ohm resistance for protection in case the external 100-ohm terminations are disconnected.

As mentioned previously, the video amplifier 24 is operative only during the duration of the gate 27. The manner in which this video gate 27 is developed and applied to the video amplifier 24 is now described in detail. The video gate 27 is formed in the stage 28, to which is applied the A1 trigger. The stage 28 (Fig. 7), as shown in Figures 3 and 8, includes a coincidence tube V–9326, to the grid of which is applied the A1 system trigger. The grid of this tube, in its quiescent state, is biased below cut-off and is driven above cut-off by the system trigger. A negative potential applied to the suppressor grid of tube V–9326 maintains the tube below cut-off until the arrival of the unblanking gates developed by operation of the antenna blanking switches 64 and 65 (Figure 2). The tube V–9326 thus conducts only when the A1 trigger and the unblanking gate are simultaneously present on the control grid and suppressor grid of the tube V–9326. Thus, A1 triggers appear in the anode circuit of tube V–9326 only during the periods of the unblanking gates, and are applied therefrom to the flip-flop circuit comprising tubes V–9329A, B.

The negative A1 trigger causes tube V–9329B to cut off, and a resulting rise in its anode voltage is transferred through condenser 160 to the grid of tube V–9329A, which then starts to conduct. Tube V–9329A continues to conduct while tube V–9329B continues in its cut-off condition until the arrival of a negative trigger on control grid of tube V–9329A, i. e., negative L trigger. The L trigger developed in the aforementioned map generator, delay for approximately one-quarter of a microsecond in delay line Z–9302, is applied to the control grid of tube V–9328B which, in its quiescent state, is normally cut off. This L trigger thus delayed appears as a negative trigger on the anode of tube V–9328B from where it is applied to the anode of tube V–9329B and through C20 to control grid of V–9329A. The video sampling gate 27 thus created is applied to the gating amplifier V–9315 to gate the incoming video and also to the control grid of gating tube V–9314B, for range mark mixing gating, and also to coincidence tube V–9327 for a C and L trigger gating. The gate starts earlier than the C trigger and terminates later than the L trigger in order to include both triggers within its duration.

It is noted that whereas the gate 27 applied to the suppressor grid of tube V–9315 is a positive gate, a gating voltage 27A of the same duration developed on the cathode of tube V–9329B is applied to the control grid of tube V–9314B. The action and purpose for applying such gating voltage to the tube V–9327 will be more evident from the following description.

In order to encompass both the C and L triggers on the composite video train, as alluded to previously, the tubes V–9327 and V–9325A and B serve a useful purpose. The A1 system trigger is applied through delay line Z–9301 to the control grid of tube V–9325A. This delay line imparts a three-quarters of a microsecond delay to the system trigger, and it is observed that the tube V–9325A is a cathode follower mixer tube normally maintained in its quiescent state at cut-off. The delayed A1 trigger thus appearing on the cathode of tube V–9325A is termed the C trigger and occurs at time $T_c$ (Figure 12). The L trigger is applied to the control grid of tube V–9325B which also, in its quiescent state, is maintained at cut-off. The L trigger appears on the common cathode of tubes V–9325A and B at some variable time $T_1$ (Figure 12) after the appearance of the C trigger.

The precise time $T_1$ is determined by the circuitry in the map generator, and in general is a function of the azimuth or elevation antenna beam angle voltage in accordance with the principles and techniques described and shown in the aforementioned patent application of Green et al., Serial No. 222,511. Both the C and L triggers appearing on these common cathodes are applied to the control grid of the coincidence tube V–9327 which, in its quiescent state, is grid biased below cut-off. The suppressor grid of tube V–9327 is also normally biased at a voltage below the plate current cut-off level of the tube. Upon the arrival of the video sampling gate to the suppressor grid of tube V–9327, the suppressor grid is released from its cut-off bias and the tube is enabled to conduct for the duration of each C and L trigger applied to the control grid of tube V–9327.

These triggers reproduced at the anode of tube V–9327 are impressed on the primary winding of blocking oscillator transformer T–9303. Blocking oscillator tube V–9328A has applied to its grid the C and L triggers from the secondary winding of transformer T–9303, and reproduces the triggers on its cathode. The grid of tube V–9328A, in its quiescent state, is biased below the cut-off point, and this tube is caused to pass the one cycle of self-oscillation only upon the application of the C and L triggers. The C and L triggers thus appearing on the cathode of tube V–9328A are applied to two parallel connected potentiometers 165, 166. It is observed that the movable taps of these potentiometers 165, 166 are connected to opposite stationary terminals of the single pole double throw switch of relay K–9302, so that during the elevation scanning period the amplitude of the C and L triggers applied to the control grid of tube V–9320B is determined by the setting of the tap on potentiometer 165; and conversely, the amplitude of the C and L triggers during the azimuth scanning period is determined by the setting of the tap on potentiometer 166. These controls 165, 166 are adjusted so that the C and L triggers each have an amplitude of 12 volts during the azimuth scanning period, and each have an amplitude of 20 volts during the elevation scanning period.

To further complete the description of Figures 3 and 8, and to describe the manner in which the Az.-El. antenna beam angle voltage is transferred over a single conductor, reference is had to the relay control tube V–9308 and relay K–9301. The relay gate shown in Figure 2 as being developed by operation of the switch 69 is applied to the control grid of tube V–9308. This voltage is in the order of 28 volts and serves to cause the tube V–9308, normally non-conducting, to conduct and to energize the winding of relay K–9301.

It is noted that this relay gate brackets the azimuth antenna scanning period. Energization of relay K–9301 causes azimuth angle voltage to appear on the Az.-El. angle voltage lead 170 for use by other components of the system. It is noted that the lead 170 thus carries both the azimuth and elevation beam angle voltages which appear alternately. During periods of elevation antenna scan, the blanker switch relay gate is absent, relay K–9301 is deenergized, and the elevation angle voltage appears on the lead 170. By this expedient a single line serves to carry the output of both angle voltage generators alternately and in synchronism with scanning periods of the antenna. The winding of relay K–9302 may be serially connected with the relay winding K–9301, so that it may be energized in a like manner to give, as mentioned previously, the C and L triggers an amplitude of 12 volts during the azimuth scanning period and 20 volts during periods of elevation scanning.

Also considered of importance in this present arrangement is the 150-volt regulated power supply shown in Figure 18. In Figure 18 a regulated voltage of 150 volts is obtained using a series regulator tube V–9330 and control tube V–9331. A 300-volt voltage source has its ungrounded positive terminal connected to the anode of tube V–9330 and to the anode of tube V–9331 through the series resistance R–9457. The plate-cathode voltage drop of tube V–9330 establishes a positive voltage of 150 volts on the cathode of tube V–9330 through the voltage divider and amplifier circuit comprising tube V–9331 and resistors R–9458, R–9459 and R–9460, which are connected to the ungrounded negative terminal of the −210 volt source. Any load changes causing voltage variations on the 150-volt output terminal 172 creates an opposing conductance condition in amplifier tube V–9331 which, in turn, varies the conductance level of tube V–9330, thereby compensating for the load change. Also any change in the −210 volt bias source will cause a compensatory change in the level of the +150 supply thereby stabilizing circuits such as V–9329 which operate between these two sources of supply.

*Means and techniques for applying composite video train bracket by C and L triggers to cathode 11 of tube 12*

From the foregoing description the means and techniques whereby that portion of the composite video train shown in Figure 1, which includes only the C and L triggers, and that portion of the video bracketed by the C and L triggers, are described above. It is only the specifically mentioned portion of the video train that is required for producing the cathode ray tube displays at a local station, and in that respect the C and L triggers either may be different amplitudes or the same amplitude during the azimuth and elevation scanning periods. The production of local displays of this character using only the specifically mentioned portion of the video train thus comprise the first alternate arrangement shown herein while, as will be described hereinafter, the second alternative arrangement useful in producing the displays at a remote location incorporates means at the local station for placing the reference and data triggers (Figure 11) on the composite video train for transmission to such remote location.

The following description, in relationship to Figures 4 and 10, serves to fully describe the manner in which, first, the video bracketed by the C and L triggers is applied as a negative going signal to the cathode 11 of the cathode ray tube 12, and, second, the manner in which the gate channel connected to terminal No. 3 develops a positive going gating voltage for application to the control grid 17 of tube 12, the boundaries of such gating voltage being determined by the D and L triggers, respectively. It is observed that the video channel connected to terminal No. 4, which includes the delay line 13 and amplifiers 14, 15 and 16, is alluded to above.

The video amplifying channel in general is conventional, but of importance is the manner in which the final amplifier stage 16 is controlled in accordance with certain triggers for purposes of preventing "blooming" at the extremities of the cathode ray tube display. Such triggering voltage is transferred to the amplifier stage 16 through tube V–6012A, which has its cathode connected to the cathode of tube 16 as shown in Figure 10. The manner in which the tube 16 is thus controlled by variations of potential on a cathode of tube V–6012A will be more clear from the following description of the gate channel which includes terminal No. 3. In general this gate channel, including terminal No. 3, the blocking oscillator tube V–6005A, B, diode V–6007A, cathode follower V–6006A, multivibrator stage including tubes V–6006B and V–6008A, shaper and inverter tube V–6008B, level control tube V–6007B and tube V–6012A. This gate channel selects information from the composite video train to form the intensity gate and serves also to gate off the video channel, i. e., the video amplifier tube 16 for triggers above certain specified amplitude.

In the operation of this gate channel, the composite video train is applied to the control grid of the first blocking oscillator tube V–6005A, which serves as the trigger tube. Resistance R–6018, which is serially connected with resistance R–6019, serves to determine the amplitude at which the blocking oscillator tube V–6005B is triggered and this resistance is adjusted so that the blocking oscillator stage is fired by all C and L triggers, but does not fire on any video signals. It is noted in this respect that the C and L triggers are always of much greater amplitude than the video signals bracketed by such C and L triggers.

It is desired to separate the C and L triggers and this is accomplished as follows: consider the fact than any trigger which passes through the gated cathode follower tube V–6006A is delayed approximately 22 microseconds by the circuitry in the sweep amplifier and is returned as a D trigger. The manner in which the C trigger is delayed in time to form the D trigger is indicated in Figure 4 wherein the delay multivibrator 98 serves to impart such delay. The D trigger is applied to the multivibrator stage comprising tubes V–6006B and V–6008A. The D trigger initiates operation of this multivibrator stage V–6006B, V–6008A, which, in turn, gates off the cathode follower tube V–6006A. Thus, while initially the C trigger causes the gated cathode follower stage V–6006A to become conductive, the subsequently developed D trigger serves to initiate a gate which causes the cathode follower stage V–6006A to be rendered inoperative and any subsequent trigger then is not passed through the cathode follower stage V–6006A until after the multivibrator stage V–6006B and V–6008A is returned to its normal condition.

After the last mentioned multivibrator stage is started, it may be stopped by any subsequent trigger on the composite video train, i. e., by the L trigger. This is accomplished by applying the blocking oscillator pulse developed in the winding 170 of the blocking oscillator transformer T–6003 through diode V–6007A to the anode of tube V–6006B. The amplitude of this pulse for accomplishing this may be adjusted by the so-called gates stop adjusting resistance 171, which is serially connected with winding 170.

Recapitulating, the C trigger causes the blocking oscillator stage V–6005A, B to fire. The resulting signal passes through cathode follower V–6006A and is delayed approximately 22 microseconds by the delay in multivibrators 98 (Figure 4) to form the so-called D trigger. Multivibrator stage V–6006B, V–6008A is started by this D trigger which, in turn, shuts off the cathode follower tube V–6006A. The L trigger, which follows the C trigger on the composite video train a variable time in the order of 30 to 140 microseconds, causes the blocked oscillator stage V–6005A, B to fire. The blocked oscillator signal resulting from this L trigger, fed to the anode of tube V–6006B, causes the multivibrator stage V–6006B, V–6008A to return to its normal condition. A negative gate as a result is available at the cathode of tube V–6008A, which is the same length as the spacing between the D and L triggers. After this negative gate is shaped and inverted by stage V–6008A, it is applied to the grid of the cathode ray tube as an intensifying gate. The intensity level of this gate is set by adjusting the clipping level of tube V–6007B by the time base intensity control. Since the same trigger which stops the intensity gate, i. e., the L trigger, appears in the video channel at several times normal video amplitude, it is desired that some precaution be taken to prevent "blooming" at the outline of the different azimuth and elevation displays. This is accomplished by applying the blocked oscillator pulse appearing on the cathode of tube V–6012A to the cathode of the video output tube V–6004 of stage 16.

It is noted, as previously described, that the composite video train in the video channel is delayed by the delay line 13 a time in the order of ¼ microsecond to thereby allow time for the blocked oscillator V–6005A, V–6005B to fire and cut off tube V–6004 during the C and L trigger times. In this respect it is noted that the control grid of tube V–6012A is connected to the control grid of the blocked oscillator tube V–6005B. This result is shown graphically in Figures 19, 20, 21 and 22.

Figure 19 shows in enlarged form a portion of the composite video in the L trigger time. Figure 9 represents the output if the L triggers were allowed to pass through. In such case objectionable "blooming" at the outlines 174, 175, for example, of the elevational display 32, would result. However, Figure 21, in comparison to Figure 19, represents the actual conditions existing at or near L trigger time. In Figure 21 the positive going L trigger gate in the outputs actually defines the outline of the azimuth display, the time base intensity gate being dropped sufficiently so that the cathode tube remains deintensified after the L trigger gate.

It is also of importance that D.-C. restoring action be applied directly at the cathode of the tube 12. This is accomplished by the clamping action of tube V–6003B on C–6006. The action of this clamping combination is such that positive signals applied to the anode of V–6003B cause conduction and a resultant charging of condenser C–6006. In order that condenser C–6006 not be charged by the positive C and L trigger gates it is desirable to render V–6003B inoperative during the time of these gates. This is accomplished by applying the blocking oscillator signal through tube V–6012B during the C and L trigger gate time. The cathodes of V–6012B and V–6003B are parallel connected and the blocking oscillator signal is developed across R–6035 by conduction of V–6012B thereby rendering V–6003B inoperative.

*Production of indications at remote locations*

As taught above, an azimuth elevation representation or display of the character shown in Figure 1 is produced using: (1) A pair of C and L triggers serving to gate the transfer of the radar video signals to the cathode of the cathode ray tube, the gate produced by such C and L triggers having a time length and being commensurate with the spacing between the C and L triggers in Figure 1, whereby the various range mark pulses, cursor pulses and radar video signals may serve to intensify the cathode beam to produce corresponding visual indications during the duration of such gate; (2) a relay gate having a duration commensurate with the time required for development of the azimuth display is developed to cause the electrical center of the azimuth and elevation displays to be shifted alternately, it being noted that both azimuth and elevation displays are produced by a cathode tube having a single electron gun structure, and that the azimuth and elevation displays are presented on a time sharing basis; in other words, first the elevation display is presented, then this aforementioned relay gate begins to shift the electrical center from the point $O_1$ to $O_2$ in Figure 1, and such electrical center remains at the point $O_2$ until the azimuth display is presented. At the end of the azimuth display, the relay gate terminates and the electrical center is returned to the point $O_1$ from which the cathode ray beam sweeps emanate radially to produce the elevation display, and so forth; (3) antenna beam angle voltage, which varies in accordance with the angular position of the radiated antenna beam, is developed and used to modulate the cathode beam sweeps to thereby change their radial position to effectively produce pivoting of the sweeps about the adjusted electrical center points $O_1$ and $O_2$.

In re-creating the azimuth and elevation displays at the remote station the element (1) listed above, namely, the C and L triggers, is transmitted to the remote station, but the C and L triggers are modulated in amplitude for purposes of developing the aforementioned element (2), namely, the relay gate. In other words, the relay gate as such is not transmitted to the remote location. The element (3) above, namely, the antenna beam angle voltage is represented by the variable spacing between the reference and data triggers in Figure 11 in the composite video train, and thus, likewise the antenna beam angle voltage as such is not transmitted to the remote station, but the amplitude of such angle voltage is measured by the spacing between the reference and data triggers.

The C trigger is placed on the composite video by means described above and is separated from the composite viedo train by the video amplifier and is used as mentioned above to determine when the sweep amplifier at the remote location is to start a sweep and when the video amplifier is to start an intensity gate. It is noted that the sweep amplifier and video amplifier at the remote location are identical with those described in connection with Figures 4 and 18. The amplitude of the C trigger is 12 volts when the azimuth picture is presented, and is 20 volts during the presentation of the elevation picture.

As mentioned above, one function of the L trigger is to limit, clip and generally tailor the shape of the azimuth and elevation displays, and as clearly incorporated by reference in the aforementioned application, the appearance of the L trigger with respect to the C trigger varies in time to limit the length of the visible cathode beam sweep. Another function of the L trigger is to determine when the video amplifier is to terminate the intensity gate. The amplitude of the L trigger varies in the same manner as the C trigger, namely, its amplitude is 12 volts when the azimuth picture is presented and is 20 volts when the elevation picture is being presented. Thus, the C and L triggers are effectively amplitude modulated and the change in amplitude is interpreted by the apparatus shown herein to produce a relay gate, namely, element (2) above, which serves effectively to tell the sweep amplifier whether to place the picture in the azimuth or elevation position on the cathode ray tube.

The range marks, for purposes of the present invention, either may have fixed amplitudes or may be amplitude modulated in accordance with so-called V-follower information. In the present instance they are shown as being amplitude modulated inasmuch as it is desired to present such V-follower information at the remote station.

The pair of reference and data triggers are time spaced from each other a distance proportional to the angle voltage. This variable spacing is interpreted by the apparatus at the remote location to properly orient the radial cathode beam sweeps, all of which emanate either from the adjusted electrical center $O_1$ or $O_2$, as the case may be.

*Special apparatus at local station useful in producing remote indications*

The manner in which the C and L triggers and the pulses, signals and triggers between such C and L triggers in Figure 11 are placed on the composite video train is described above and need not be repeated here.

For remoting purposes, this part of the composite video signal, i. e., that portion between and including the C and L triggers, is applied from either the terminal No. 1 or No. 2 in Figure 3 to the terminal 210 in Figure 13 which is coupled to the control grid of the line driver tube 211 through coupling condenser 212 and resistance 213. The junction point of condenser 212 and resistance 213 is connected to the cathode of the D.-C. restorer tube 214, which has its anode connected through resistance 215 to the negative ungrounded terminal of voltage source 216. The diode tube 214 is shunted by the resistance 217 and the anode of tube 214 is connected through resistance 218 to the cathode of tube 211. This cathode is connected to the negative ungrounded terminal of the voltage source 220. The screen grid of the pentode driver tube 211 is grounded, while the anode of tube 211 is connected through resistance 222 to the central conductor of the transmission line 223, which has its sheath grounded. Such central conductor is returned to ground through the loading resistance 224. Also applied to such central conductor is the pair of reference and data triggers 226, 227, respectively (indicated also in Figure 11), which occurs periodically at the repetition rate of the system, which, for example, may be in the order of 1800 pulses per second. Such pair of reference and data triggers is, in fact, developed by the radar system trigger applied to the input terminal 228 of the apparatus shown in block diagram herein, but described specifically and claimed in the copending application of Thomas J. Johnson, Jr., et al., Serial No. 203,304, filed December 29, 1950, and assigned to the same assignee as the present application. The disclosure in such Johnson et al. application is incorporated herein by this reference thereto.

Briefly, this reference and data trigger developing circuit may be described as follows. The system trigger A1 applied to the terminal 228 is coupled to the trigger tube of a conventional delay multivibrator stage 229. The voltage developed in the multivibrator is differentiated so as to appear in the form shown at 230. This differentiated waveform 230 is applied to the reference blocking oscillator stage 231 to develop a sharp positive reference trigger 232 at one of the output terminals thereof. This reference trigger 232 is coupled to the internal conductor of the transmission line 223 in accordance with the means developed herein and described later.

The reference trigger 232 is applied likewise to the data multivibrator stage 233 to produce a negative-going gating voltage 235. This gating voltage 235 is applied to the sweep generator stage 236 to develop positive-going sawtooth waves of the form shown at 237, which are applied to the pickoff stage 238, such stage 238 being controlled in accordance with antenna beam angle voltage applied at the terminal 240 and having the general waveform indicated at 241.

It is noted that the variation of the beam angle voltage applied to terminal 240 is at a relatively slow rate, it being remembered that it requires approximately one-quarter of a second for either the azimuth of the elevation voltage to change from one of its extreme values to the other of its extreme values. On the other hand the sawtooth waves 237 are applied at a relatively high rate, namely, a rate in the order of 1800 per second. The output of the pickoff stage 238 appears as a negative-going pulse 240 delayed in time in accordance with the instantaneous magnitude of the beam angle voltage applied to the stage 238. Such negative-going wave is shaped in the amplifier stage 242, the output of which is applied to the data blocking oscillator stage 243. The output of this stage 243 is the data trigger 244, which is coupled to the transmission line 223 in the manner described presently.

The reference trigger 232 is applied through condenser 245 to the control grid of tube 246. Likewise, the data trigger 244 is coupled through condenser 247 to the control grid of tube 248. The anodes of tubes 246 and 248 are jointly connected to the internal conductor of transmission line 223, while the cathodes of tubes 246 and 248 are jointly connected to the negative ungrounded terminal of voltage source 250 through adjustable resistance 252. Such negative terminal of source 250 is connected to the control grid of tube 248 through resistance 254, which has a tap thereon connected to a tap on resistance 255. The resistance 255 is connected between the control grid of tube 246 and the negative ungrounded terminal of source 258.

Thus, by the means described above, the entire composite video train, including the reference and data triggers shown in Figure 11, are applied to the internal conductor of the transmission line 223, but it is noted that instead of being positive-going triggers and pulses, as shown in Figure 11, they are inverted, i. e., all of the same being negative-going.

*Apparatus at remote station*

The entire composite video train thus transferred over the transmission line or cable 223 is applied to the ungrounded terminal of the gain control resistance 260, which has its adjustable tap coupled to the stage 261 labelled "Cancellation system with differential amplifier." The general purpose of such stage 261 and the apparatus therein is described and claimed in the copending application of Green et al., Serial No. 224,972, filed May 7, 1951, now Patent 2,734,944, and assigned to the same assignee as the present application.

Briefly, such stage 261 is used to substantially reduce or eliminate pickup voltages induced electrostatically and/or electromagnetically in the extended transmission line 223, and to compensate for differences in ground potential between the local station and the remote station. The stage 261 depends for its operation on the use of a similar parallel extending cancellation line 263 terminating at the local station in the resistance 264, and being connected at the remote station to stage 261 through an adjustable phasing control resistance 265, an adjustable gain control resistance 267 shunted by the condenser 268, and the adjustable balance control resistance 269.

The composite video train appearing at the output of stage 261 is applied to the equalizer stage 262, which serves effectively to compensate the high frequency components of the composite video train which are attenuated in transmission over the extended transmission line or cable 223. The output of the equalizer stage 262 is applied successively to the amplifier stage 270 and cathode follower stage 271, the D.-C. level of the composite video train being controlled by the D.-C. level restoring stage 272. The output of the cathode follower stage 271 is applied to as many as four video amplifiers at the remote location of the type shown in Figures 10 and 4.

The video amplifier as shown in Figures 10 and 4 functions in precisely the same manner as described above to cause that portion of the video train bracketed between the C and L triggers to be applied to the cathode, i. e., intensity control electrode, of the cathode ray tube.

The functioning and operation of the differential amplifier stage 261 in Figure 13 is now described in connection with Figure 17. In Figure 17 the composite video applied to the terminal 10M and central conductor of the coaxial cable 223, having its sheath grounded, is after reception at the remotely located station subjected to the action of the differential amplifier 15M, which includes the tubes 16M, 17M and 18M. The output of the differential amplifier 15M appearing at the anode of tube 16M is subjected to an equalizing network 262 which includes the tube 21M. The output of such equalizing network 262 appearing at the anode of tube 21M is coupled to the indicating apparatus 14M through coupling condenser 22M.

In accordance with certain important aspects of the present invention, an auxiliary transmission line 263, termed the cancellation line, is used for the purpose of cancelling bothersome interfering pickup voltages which may be induced in the transmission line 223. For this purpose the cancellation line 263 is of identical structure as the transmission line 223 and extends parallel therewith in closely spaced relationship so that such line 263 is subjected to the same interference as the transmission line 223. Also the terminating impedances at corresponding ends of the lines 223 and 263 are substantially the same, although, as will be described hereinafter, the terminating impedance of the line 263 at the remotely located station is made adjustable for accomplishing cancellation. At the remoting or transmitting station the terminating impedances for the lines 223 and 263 are fixed in magnitude and comprise resistances 224 and 264, respectively.

At the remotely located station the terminating impedance for the line 223 includes the potentiometer type resistance 260, which has its adjustable tap connected to the control grid of tube 16M. The resistance 260 thus serves as a voltage dividing element whereby the level of the signal applied to the control grid of tube 16M may be adjusted. Such signal includes the composite video train as well as interfering voltages induced in the line 223.

The line 263 terminates at the remote station in an impedance represented by the two serially connected elements, namely, (1) the adjustable cancellation phasing resistance 265; (2) the adjustable cancellation gain resistance 267 shunted by the condenser 268. The tap on resistance 267 is connected to one terminal of adjustable cancellation balancing resistance 269. The other terminal of resistance 269 is connected to the control grid of tube 17M. The fixed resistance 32M has one of its terminals connected to the control grid of tube 17M and the other one of its terminals connected to the ungrounded terminal of voltage source 33M, which may be considered for present purposes to have zero resistance.

Thus, the outputs from the lines 223 and 263 are applied to the control grids of tubes 16M and 17M, respectively. Tubes 16M and 17M have their cathodes connected jointly to the anode of tube 18M, of the pentode type. The screen grid of tube 18M is returned to ground through resistance 35M shunted by condenser 36M. The control grid of tube 18M is connected to the negative ungrounded terminal of voltage source 37M and the cathode of tube 18M likewise is connected to such ungrounded terminal through resistance 38M.

It is observed that pentode tube 18M is thus connected and serves as a constant current device for the flow of space current which flows jointly through tubes 16M and 17M. To complete a path for the flow of such space current, the positive ungrounded terminal of voltage source 40M is connected to the anode of tubes 16M and 17M through corresponding plate resistances 41M, 42M.

As will be described in detail hereinafter, the circuitry thus far described serves as a differential amplifier effective to substantially reduce or entirely eliminate the effects otherwise produced by induction of interfering voltages into the transmission line 223, and from deleterious effects produced by differences in ground potential between the local and remote stations.

The cancelled output of this differential amplifier 15M is applied from the anode of tube 16M through coupling condenser 43M to the control grid of pentode tube 21M, such control grid being maintained at a negative potential with respect to its grounded cathode by the voltage source 45M having its negative ungrounded terminal connected to such control grid through serially connected resistances 46M and 47M. The junction point of resistances 46M and 47M is returned to ground through resistance 48M. The tube 21M forms a component part of the equalizer network 262, and while the specific form of equalizer network shown herein is preferred, it is understood that certain aspects of the present invention may be practiced using other different types of equalizing networks.

The specific network shown herein serves to produce a compensatory effect for the loss suffered by the high frequency components of the video in its transmission through the cable or transmission line 223, which may have a length of two miles. To produce such compensatory effect, the anode of tube 21M is serially connected to the positive terminal of voltage source 50M through equalizing circuits 51M, 52M and variable resistance 53M. The equalizing circuit 51M includes shunt connected resistance 51A, inductance 51B and condenser 51C. Similarly, the equalizing circuit 52M includes shunt connected resistance 52A, inductance 52B and condenser 52C. The screen grid of tube 21M connected directly to the positive terminal of source 50M. The output of the equalizer network appearing at the anode of tube 21M is coupled to the indicating apparatus 14M through coupling condenser 22M.

Since the components of the composite video train are non-uniformly attenuated frequencywise by the remoting cable or line 223, the equalizing network serves to reshape the video signals, and this in general is accomplished by the network which has approximately inverse frequency characteristics of the line.

The negative-going video signals from the end of the remoting line 223 are applied to the control grid of tube 16M through gain control resistance 260. Due to the extremely high signal impedance presented to the cathode of tubes 16M and 17M by tube 18M, any change in current in tube 16M due to signals applied on its grid are duplicated by changes in current in the opposite direction by tube 17M. In other words, signal voltage applied to the grid of tube 16M causes a direct transfer of current from tube 16M to tube 17M. If, on the other hand, similar voltages are applied to the grids of tubes 16M and 17M simultaneously, no change in plate current in either tube will result. The input to the grid of tube 17M is from the end of a dummy cancellation line 23M, which is run parallel to the remoting line 223 so that any pickup and difference in ground potential may be duplicated at both grids of the differential amplifier 16M, 17M. Only the difference signals between the output of the remoting line 223 and the dummy line 263, which is the composite video train shown in Figure 11, result in current change in the differential amplifier tube. Noise and pickup having been cancelled, the video signals are taken from the plate of tube 16M as positive-going signals.

Using normal amplitude composite video into the line driver coupled to terminal 10M and viewing the output video at the anode of tube 21M with a synchroscope, the following adjustments are made. Reduce video input to zero amplitude by grounding the tap on resistance 260, and set cancellation balance resistance 269, so that a differential reading between the movable tap and the grid of tube 16M shows zero D.-C. voltage. Set the video gain resistance tap so that the proper level video appears. Now set the cancellation gain resistance 267 and cancellation phasing resistance 265 so that the ripple voltage (which is caused by inductive pickup on the lines 223, 263) is a minimum. These steps should be repeated two or three times due to interaction between the controls.

Tube 21M is used as in an equalizer stage. This stage uses as its plate load a combination of resistances, inductances and capacitances in a circuit which gives an approximate inverse characteristic of the remoting line for pulse response, as mentioned previously.

In Figure 17 the parallel circuit 51 comprising inductance 51B, condenser 51C and resistance 51A, is tuned to approximately 4 megacycles and without the parallel tuned circuit 52M, the resultant overall response has a dip in it at approximately 400 kilocycles. For this reason the additional tuned circuit 51M is used to raise this "dip" in the response curve, such circuit 51M being tuned to 400 kilocycles.

*Relay gate producing means at remote location*

Certain means described under this heading is described and claimed in the copending patent application of James R. Deen, Serial No. 230,646, filed June 8, 1950, and assigned to the same assignee.

The C and L triggers in the composite video train shown in Figure 11 having amplitudes of 12 volts during azimuth antenna beam scanning and 20 volts during elevation antenna beam scanning are used to produce the relatively long relay gate, using the apparatus shown in block form in Figure 13, which apparatus is shown more specifically in Figure 14. For this purpose, the composite video train is applied through coupling condenser 274 to the relay gate forming channel having the input terminal 275 and the output terminal 276.

Briefly, the operation of this gate generating channel is as follows. The negative-going gate 277 appearing at the output terminal 276 is produced during the time the elevation antenna beam is scanning, i. e., during the period when the C and L triggers have their maximum amplitudes of 20 volts. During the time the azimuth antenna is scanning, these C and L triggers have an amplitude of 12 volts. It is desired that both the leading and trailing edges of the negative-going gate 277 be accurately spaced so that they fall in the period between the azimuth and elevation antenna beam scanning periods, and for that purpose special compensatory arrangements described in detail hereinafter are provided. In general, the negative-going gate 277 is produced by integrating effectively the series of C and L triggers occurring during the elevation scanning period. However, since some time is required in the step detector or integrating networks described hereinafter, the leading edge of the negative-going gate is necessarily delayed a period too long for operation of the system as intended. To counteract such undesirable delay the leading edge of the negative-going gate otherwise delayed is advanced by control voltages developed during the preceding azimuth beam angle scanning period.

More specifically, the composite video train is applied to the input resistance 278, which has an adjustable tap connected to the input terminal of the amplifier stage 279. It should be noted at the outset that this relay gate forming circuit is amplitude selective in that the same will not respond to triggers or pulses having an amplitude appreciably less than 12 volts. In other words, the much smaller reference and data triggers, as well as the range marks, cursor pulses and video signals, are ineffective to operate this relay gate forming channel. This is true since the elevation blocking oscillator stage 280 and azimuth blocking oscillator stage 281, coupled respectively to the amplifier 279 through condensers 282 and 283, are operated only when the triggers applied thereto have amplitudes in the order of 20 and 12 volts, respectively.

During the elevation beam scanning period when the C and L pulses have an amplitude of 24 volts, the elevation blocking oscillator stage 280 is operated to produce a sharp pulse in accordance with each one of the C and L triggers. The relationship of these C and L pulses during the elevation scanning period and the resulting pulses produced at the output of the blocking oscillator 280 is shown in Figure 15 at *a* and *c*, respectively. These pulses thus produced in the blocking oscillator 280 are integrated in the step detector circuit 284, the output of which appears as shown at *d* in Figure 15. The output of the step detector 284 is applied to the gate control stage 285 which, insofar as the elevation channel itself is concerned, is an inverter which inverts and shapes the pulse applied from stage 284. The output of stage 285 is applied to the first cathode follower stage 286 which, in turn, is coupled to the second cathode follower stage 287 having the output terminal 276. It is noted that a regenerative feed-back circuit 288 extends from the output of the cathode follower stage 286 to the gate control stage 285 for purposes mainly of obtaining a fast and unsluggish response, particularly in the transitional period between the end of an azimuth scanning period and the start of the next succeeding elevation scanning period. The output, in the form of a negative gate 277, which corresponds with the negative-going gate without compensation shown in Figure 15 at *g* is produced.

In order to more fully understand Figure 15, it is observed that the groups of triggers appear in the order indicated at *a* in Figure 15, and with the time axis thus established the line or edge 289 defines the leading edge of the negative-going gate, while the full line 291 represents the trailing edge of the same gate. It is desired that the leading edge 289 be shifted forwardly with respect to time to the position indicated by the dotted line or edge 290. In such case the leading edge 290 occurs in the desired transitional period between the azimuth and elevation scanning periods. In such case a composite gate indicated at *g* in Figure 15 corresponds with the desired gate shown at *b* in Figure 15.

The means whereby such leading edge 289 is shifted forwardly in time to obtain the leading edge indicated at 290 is now described generally and such compensatory means includes generally the azimuth blocking oscillator stage 281, the step detector 292, the inverter stage 293, the cathode follower stage 294, differentiating network 295, a portion of the gate control circuit 285, and a connection 296 extending from the cathode follower stage 287 to the input of the blocking oscillator stage 281 for purposes of preventing operation of the azimuth blocking oscilaltor stage 281 during the time that the negative gate is present in the cathode follower stage 287, i. e., during the elevation scanning period.

The azimuth blocking oscillator stage 281 is coupled through condenser 283 to the amplifier 279, but is rendered ineffective during the elevation scanning period by the negative gate 297 applied over the lead 296 from the cathode follower stage 287. Thus, only during the azimuth scanning period the azimuth blocking oscillator stage 281 is operated to produce corresponding output pulses shown at *e* in Figure 15. These pulses are step detected in detector stage 292 to produce the waveform shown at *f*. After this waveform is inverted in inverter and shaper stage 293, it is applied to the cathode follower stage 294. The output of the cathode follower stage 294 is thus a positive-going gating voltage 298, which of course is developed only during the azimuth scanning period. Such positive-going gate 298, represented also at *h* in Figure 15, is differentiated in the differentiating network 295 to produce the differential output voltage represented at *i* in Figure 15. This differentiated output voltage is applied to the gate control 285 and as described in greater detail hereinafter, effectively serves to shift forwardly in time the leading edge of the gate 277, which ultimately appears at the output terminal 276 in the manner indicated at *g* in Figure 15.

For a more detailed description of the relay gate forming channel described in relationship to the block diagram in Figure 13, reference is made to Figure 14. Corresponding tubes in Figures 14 and 15 are denoted by the same numbers.

The negative-going composite video, including the C and L triggers, are developed across the input potentiometer resistance 278, the adjustable tap of which is connected to the control grid of the amplifier tube V–318A. The output voltage appearing on the anode of this tube is coupled, on the one hand, through ocndenser 282 to the control grid of the trigger tube V–319A of the blocking oscillator stage V–319A, V–319B; and, on the other hand, for purposes described later, through condenser 283 to a similar but azimuth blocking oscillator stage V–323A, V–323B. The adjustable tap on resistance 278 is adjusted so that only the C and L triggers, having a magnitude of 20 volts, are effective to fire the blocking oscillator stage V–319A, V–319B. The trigger tube V–319A is, in its quiescent state, normally nonconducting, but a positive C or L trigger applied to such control grid causes the oscillator tube to fire, to thereby produce elevation triggers at its cathode output terminal 301, of the character shown at *c* in Figure 15. These elevation triggers, which comprise triggers corresponding both to C and L triggers, are applied through condenser 302 to the step detector stage which includes the tube V–320A, a diode. The anode of tube V–320A is connected to the condenser 302, while the cathode is connected to the ungrounded terminal of the condenser 303, having a capacity in the order of 10,000 $\mu\mu$f. The cathode of tube V–320A is likewise returned to the negative ungrounded terminal of voltage source 304 through resistance 305. Resistance 306 is connected between the anode of tube V–320A and the negative terminal of source 304. The resistance 305 may have a value of 1 megohm, and the resistance 306 may be 100,000 ohms. The voltage thus developed on condenser 303 is of the form shown at *d* in Figure 15 and such voltage is applied through resistance 307 to the control grid of tube V–321A in the gate control stage 285.

It is observed at this time that the tube V–321A and tube V–321B have their anodes and cathodes connected respectively, and that both of such tubes are use to couple voltages to the cathode follower tube V–322A, the control grid of tube V–321A, however, being sensitive only to elevation voltages, while the control grid of tube V–321B is sensitive only to azimuth voltages for the aforementioned purpose of shifting the leading edge 289 of the negative-opening gate 277 forwardly in time to the position indicated at *g*.

Neglecting for the present any azimuth voltage applied to the control grid of tube V–321B, the amplified elevation voltage developed on condenser 303 after amplification in tube V–321A, is applied to the control grid of cathode of follower tube V–322A in inverted form. The cathode of the tube V–322A is coupled through resistance 308 to the control grid of the second cathode follower stage V–322B. In order to increase the quickness of response a regenerative feedback circuit including resistance 309 extends from the control grid of tube V–322B to the cathode of tube V–321A.

Thus, under the assumption that no azimuth voltage is applied to the control grid of tube V–321B, a negative-going gate is produced at the output terminal 276 having the form shown at *g* in Figure 15, such negative-going gating voltage having the leading edge 289 and trailing edge 291.

During this period of time when the negative-going gates are developed at output terminal 276, the azimuth blocking oscillator stage including tubes V–323A and V–323B is rendered inoperative by the negative voltage applied from output terminal 276 to the control grid of trigger tube V–323A through resistances 310 and 311. Thus, by this expedient, the azimuth blocking oscillator stage fed with C and L pulses through condenser 283 is rendered operative to fire only during the azimuth beam scanning period.

During the azimuth scanning period the C and L triggers have a lessened amplitude, namely, are only 12 volts, an amount insufficient to fire the elevation blocking oscillator stage V–319A, V–319B, but sufficient to fire the azimuth blocking oscillator stage V–323A, V–323B. As a result azmiuth triggers or pulses are developed across the cathode load resistance 312 of the form shown at *e* in Figure 15 and such triggers are applied through condenser 313 to the step detector or accumulating stage 292, which includes the diode tube V–320B and condenser 314 for purposes of deevloping a voltage across such condenser 314 of the form shown at *f*.

For this purpose the condenser 313 has one of its terminals connected to the anode of tube V–320B, the cathode of such tube being connected to the ungrounded terminal of condenser 314, which may have a magnitude of 10,000 $\mu\mu$f. Resistance 315 having a magnitude of 1 megohm and resistance 316 having a magnitude of 100,000 ohms are serially connected between the anode and cathode of tube V–320B. The junction point of resistances 315 and 316 is connected to the negative ungrounded terminal of the voltage source 318. The voltage thus developed on the condenser 314 is applied through resistance 319 to the control grid of the inverting, amplifying and wave-shaping tubes V–324A and V–324B. The voltage appearing on the anode of tube V–324A is applied to the control grid of the cathode follower tube V–324B, and the voltage thus developed on its cathode is applied through a differentiating network 295 comprising condenser 321 and resistance 322, to the control grid of tube V–321B through resistance 324. It is noted that the cathodes of tubes V–324A and V–324B are interconnected by resistance 325, and that the cathode of tube V–324A is returned to the negative terminal of source 318 through resistance 326. Condenser 321 may have a magnitude of 0.25 μf and resistance 322 may have a magnitude of 1 megohm.

This differentiating network 321, 322 is thus effective to differentiate the azimuth output gate represented at *h* in Figure 15 into the form shown at *i*. The differentiation is such that a postive voltage appears on the grid of tube V–321B during the transitional period between an azimuth scanning period to the succeeding elevation scanning period. This in effect causes the voltage developed at the output of tubes V–321A, V–321B to be depressed sooner, therefore causing the leading edge of the resulting negative-going gate 289 in Figure 15 at *g* to be shifted forwardly in time.

It is observed further that a means is provided herein for "timing out" the relay gate midway between the elevation and azimuth scans. This timing out is determined by the time constant in the step detector circuit comprising tube 284, condenser 303, and resistance 367. These components may be adjusted that the trailing edge of the negative gate may be made to occur at any time between elevation and azimuth scans.

*Angle voltage channel at remote location*

The antenna beam angle voltage, either azimuth angle voltage or elevation angle voltage, as the case may be, depending upon whether the azimuth antenna beam is scanning in azimuth or whether the elevation antenna beam is scanning in elevation, is represented as mentioned previously by the spacing between the reference and data triggers in the composite video train in Figure 11. The particular means whereby the difference in spacing of these two triggers is used to produce the original angle voltage is shown herein in block form at 310 in Figure 13. The apparatus 310 and teachings for accomplishing this result is shown, described and claimed in the aforementioned application of Johnson, et al., Serial No. 203,304. The present arrangement, however, concerns itself generally with unscrambling of the various triggers, pulses and signals, and in particular with the manner in which such succeeding pairs of reference and data triggers are extracted from the composite video train and applied to the antenna beam angle converting means 310.

For this purpose the composite video train appearing at the output terminal in Figure 13 is fed through a ¾ microsecond delay line 311 (Figures 13 and 16) and condenser 312 to the control grid of tube V–327, a gated blocked oscillator trigger tube. When the suppressor grid of this tube is at zero volts the bias on the control grid is adjusted so that triggers of approximately 4 volts will cause this tube V–327 to trigger operation of the blocked oscillator tube V–328B. In other words this particular channel is also sensitive to voltages only above a predetermined threshold value so that it may be receptive only to the reference and data triggers and is not operated by voltages having intensities appreciably less than the amplitudes of such reference and data triggers.

The bias on the multivibrator trigger tube V–328A is adjusted so that such tube triggers the multivibrator stage V–330A, V–330B, when triggers of 10 volts or higher are applied to its grid. When triggers are of sufficient amplitude to start this multivibrator V–330A, V–330B, a negative gate is applied to the suppressor grid of tube V–327, thereby rendering tube V–327 insensitive to any triggers which in the interim may be applied to its control grid. The diode tube V–329 is used to prevent the suppressor grid from being driven too far positive by overshoots from the plate of the multivibrator V–330A, V–330B. The duration of the gate as applied to this tube V–327 is approximately 160 microseconds. This means that a trigger above the minimum amplitude necessary to trigger the multivibrator V–330A, V–330B causes the gated tube V–327 to be insensitive for a period of approximately 160 microseconds. The trigger which causes the multivibrator V–330A, V–330B to be operated does not pass through the gated stage V–327, because the delay line 311 interposes sufficient delay to allow first the development of the negative gating voltage on the suppressor grid of tube V–327.

More specifically, as delivered to this channel by cathode follower 271, the angle voltage triggers are approximately 8 volts in amplitude. The amplude of C and L triggers is approximately 20 volts. If only the 8-volt angle triggers are present they are passed through V–327 and trigger blocked oscillator tube V–328B. Whenever a "C" trigger is applied, tube V–328A causes the multivibrator V–330A, V–330B to be triggered and gate V–327 off for the period of 160 μs. This means that none of the video signals which follow the C trigger in the normal sequence of operation pass through V–327. In fact, V–327 is not returned to its normal condition until after sufficient time has elapsed for the L trigger to have passed. During the period between the L trigger and the next C trigger this channel is open to pass the angle voltage triggers, i. e., the reference and data triggers in Figure 11.

The angle voltage triggers from the cathode of blocked oscillator V–328B are applied to the grid of the first tube in the antenna beam angle voltage producing means 310 which functions to reproduce from such reference and data triggers the antenna beam angle voltage variations represented in Figure 6, such voltage variations being used in the remotely located cathode ray indicator circuit as described above in connection with Figures 4 and 18 in the description of the local installation.

For a more detailed description of the operation of certain elements in the systems shown in Figure 3, 7 and 8, reference is had to Figure 23, wherein a series of voltage variations are shown, in relationship to each other as they vary with respect to time.

In Figure 23, the upper curve 400 is the so-called Az.-El. relay gate and is the gate shown in Figure 5. The curve 401 on the same time scale illustrates the variation of Az.-El. angle voltage and corresponds to the variations shown in Figure 6. Curve 402 represents in the same time relationship, the angle voltage appearing at the input to the elevation picture channel. The line 403 represents the azimuth servo data No. 2 level while the line 404 represents the azimuth servo data No. 1 level. It is observed that the lower horizontal lines 405, 406 are established by the negative bias applied during off periods.

The curve 407 represents the corresponding voltage variation appearing on the anode of tube V–3092A. Correspondingly, the curve 408 represents the voltage variation on the anode of tube V–3092B. The curve 409 illustrates the signal appearing on the anode of the tube V–3093B and is the signal resulting from the elevation channel only. The cross-hatched portions 410, 411, and 412 serve to illustrate the time period during which the elevation picture channel is turned off so as to prevent interference with the azimuth channel.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, an azimuth antenna for scanning in azimuth, an elevation antenna for scanning in elevation, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to one of two center positions, means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to one of said beam deflecting means, to thereby obtain alternate azimuth and elevation displays which are each expanded with reference to the space scanned respectively by said azimuth and elevation antenna beams, said cathode ray tube having intensity controlling means, means receiving video signals in the form of echoes from objects scanned within said space, means operated synchronously with said energy transmitting means for developing a pair of control triggers between which said video signals appear and means developing a gating voltage from said control triggers and applying the same contemporaneously with said video signals to said intensity controlling means.

2. In a system of the character described, an azimuth antenna for scanning in azimuth, an elevation antenna for scanning in elevation, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to one of two center positions, means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to one of said beam deflecting means, to thereby obtain alternate azimuth and elevation displays which are each expanded with reference to the space scanned respectively by said azimuth and elevation antenna beams, said cathode ray tube having intensity controlling means, means receiving video signals in the form of echoes from objects scanned within said space, means operated synchronously with said energy transmitting means for developing a pair of control triggers between which said video signals appear, means developing a gating voltage from said control triggers and applying the same contemporaneously with said video signals to said intensity controlling means, means controlling the intensity of said control triggers synchronously with operation of said coupling means so that the intensity of said control triggers serves as an indication as to whether the azimuth antenna or the said elevation antenna is effective at that particular time, and trigger amplitude responsive means operated in accordance with the intensity of said control triggers for changing said centering means from said one centering means to the other centering means.

3. In a system of the character described, an azimuth antenna for scanning in azimuth, an elevation antenna for scanning in elevation, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to one of two center positions, means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to one of said beam deflecting means, to thereby obtain alternate azimuth and elevation displays which are each expanded with reference to the space scanned respectively by said azimuth and elevation antenna beams, said cathode ray tube having intensity controlling means, means receiving video signals in the form of echoes from objects scanned within said space, means operated synchronously with said energy transmitting means for developing a pair of control triggers between which said video signals appear, means developing a gating voltage from said control triggers and applying the same contemporaneously with said video signals to said intensity control means, means deriving a pair of triggers which are time spaced in accordance with the intensity of either said azimuth angle voltage or said elevation angle voltage as the case may be, the last mentioned triggers occurring after the duration of said gating voltage, and means recreating from said time spaced triggers a corresponding angle voltage and applying the same to said pair of quadraturely acting beam deflecting means.

4. In a system of the character described, an azimuth antenna for scanning in azimuth, an elevation antenna for scanning in elevation, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltge, the instantaneous magnitude of each of which is representative respectively of the position of the azimuth and elevation beams, a cathode ray tube having a pair of quadraturely acting cathode beam deflecting means, two position beam centering means alternately effective to move the cathode beam to one of two center positions, means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to one of said beam deflecting means, to thereby obtain alternate azimuth and elevation displays which are each expanded with reference to the space scanned respectively by said azimuth and elevation antenna beams, said cathode ray tube having intensity controlling means, means receiving video signals in the form of echoes from objects scanned within said space, means operated synchronously with said energy transmitting means for developing a pair of control triggers between which said video signals appear, means developing a gating voltage from said control triggers and applying the same contemporaneously with said video signals to said intensity controlling means, means operating synchronously with said coupling means for changing the intensity of said control triggers so that the intensity of said control triggers serves as an indication as to whether the azimuth or elevation antennas is effective at that particular time, means operated in accordance with the change in amplitude of said control triggers for changing from one of said centering means to the other said centering means, means deriving a pair of triggers occurring after said control triggers and time spaced in accordance with the magnitude of said azimuth angle voltage or elevation angle voltage as the case may be, at that particular time, and means recreating from said pair of time spaced triggers the representative angle voltage and applying the same to said beam deflecting means.

5. In a system of the character described, a source of video trains, each train comprising video signals of relatively small intensity bracketed by a pair of time spaced control triggers of relatively large intensity, the last of said control triggers being followed by a pair of time spaced reference and data triggers, means for producing a voltage representative of the time spacing between said reference and data triggers, a pair of antennas producing beams which scan through space alternately effective to receive said video signals which are in the form of echoes from objects in said space, means operated synchronously with scanning of said antenna beams for changing the intensity of said pair of control triggers, means sensitive to amplitude changes in said control triggers for developing a control voltage, a utilization device, means applying said control voltage to said utilization device, and means for separating said reference and data triggers from the composite video train and applying the same to said voltage producing means.

6. In a system of the character described, a source of video trains, each train comprising video signals of relatively small intensity bracketed by a pair of time spaced control triggers of relatively large intensity, a pair of antennas producing beams which scan through space alternately effective to receive said video signals which are in the form of echoes from objects in said space, means maintaining the intensity of said control triggers substantially constant during the scanning of any one particular antenna beam, and means changing the amplitude of said control triggers at the end of each antenna beam scanning period.

7. In a system of the character described, a source of video trains, each train comprising video signals of relatively small intensity bracketed by a pair of time spaced control triggers of relatively large intensity, a cathode ray tube having intensity control means, means deriving from said control triggers a control voltage having a time duration commensurate with the time interval between said control triggers, and means applying said control voltage to said intensity control means, and means applying said video signals to said intensity control means contemporaneously with said control voltage whereby said video signals may produce in the presence of said control voltage visible indications.

8. In a system of the character described, a source of video trains, each train comprising video signals of relatively small intensity bracketed by a pair of time spaced control triggers of relatively large intensity, the last of said control triggers being followed by a pair of time spaced reference and data triggers, means for producing a voltage representative of the time spacing between said reference and data triggers, a cathode ray tube having intensity control means and beam deflecting means, means applying said voltage to said beam deflecting means, means deriving from said pair of control triggers a gating voltage having a time duration commensurate with the spacing between said control triggers, means applying said gating voltage to said intensity control means contemporaneously with said video signals.

9. In a system of the character described, a source of video trains, each train comprising first video signals of relatively small intensity and a second signal, a cathode ray tube having intensity control means, means deriving from said second signal a control voltage having a time duration commensurate with the time interval of each video train, means applying said control voltage to said intensity control means, and means applying said video signals to said intensity control means contemporaneously with said control voltage, whereby said video signals may produce visible indications in the presence of said control voltage.

10. In a system of the character described, a source of video trains, each train comprising video signals of relatively small intensity bracketed by a pair of pulses, a cathode ray tube having intensity control means, means deriving from said pulses a control voltage having a time duration commensurate with the time interval between said pulses, means applying said control voltage to said intensity control means, and means applying said video signals to said intensity control means contemporaneously with said control voltage, whereby said video signals may produce visible indications in the presence of said control voltage.

11. In a system of the character described, a source of video trains, each train comprising first video signals and a second signal, a utilization device having control means, means deriving from said second signal a control voltage having a time duration commensurate with the time interval of said train of video signals, means applying said control voltage to said control means, and means applying said video signals to said utilization device contemporaneously with said control voltage, whereby said video signals may produce operation of said device in the presence of said control voltage.

12. In a system of the character described, a video channel, a source of time spaced control triggers of relatively large intensity, means coupling said source to said channel to produce video trains with each train comprising video signals of relatively small intensity bracketed by said pair of time spaced control triggers, a cathode ray tube having intensity control means, means deriving from said control triggers a control voltage having a time duration commensurate with the time interval between said control triggers, means coupling said video channel to said intensity control means, and means applying said control voltage to said intensity control means, and means applying said video signals to said intensity control means contemporaneously with said control voltage whereby said video signals may produce visible indications in the presence of said control voltage.

13. In a system of the character described, a source of video signals, a source of time spaced control triggers, a common video channel coupled to each of said sources within which said video signals and said control triggers are mixed to produce a source of video trains with each train comprising said video signals of relatively small intensity bracketed by said pair of time spaced control triggers of relatively large intensity, indicating means including an intensity control element, means coupling the output of said video channel to said intensity control element, and biasing means controlled by said control triggers for biasing said control element in such a manner that said video signals are rendered visible on said indicating means.

14. The system set forth in claim 13 including antenna means for producing and scanning through space an electromagnetic beam whose angular position is varied during scanning, said indicating means including cathode beam deflecting means operated in timed relationship with respect to scanning of said electromagnetic beam, and means controlling the time spacing of said control triggers in accordance with the particular angular position of the radiated electromagnetic beam.

15. In a system as set forth in claim 13 including a first means for producing and scanning through the azimuthal plane a radiated electromagnetic beam from which is derived said video signals, second means for producing and scanning through the elevation plane an electromagnetic beam from which said video signals are produced, said first and second means being alternatively effective, and means amplitude modulating said time spaced control signals in an amount depending upon which one of said first and second means is effective at that particular time.

16. A system as set forth in claim 14 including a second source of time spaced reference and data triggers which are spaced in time in an amount representative of the angular position of said radiated electromagnetic energy, means coupling said second source to said common video channel within which said video signals and said time spaced triggers are mixed to produce said video trains followed by said reference and data triggers, and said intensity control element being biased by said biasing means controlled by said control triggers such that only said video signals are rendered visible by said indicating means and said data and reference triggers as well as said time spaced triggers are rendered invisible.

17. A system as set forth in claim 14 in which said indicating means has means associated therewith for shifting the origin of indications produced on said indicating means, and means responsive to the modulation of said amplitude modulated time spaced control signals for operating said shifting means.

References Cited in the file of this patent

UNITED STATES PATENTS

| | | |
|---|---|---|
| 2,403,975 | Graham | July 16, 1946 |
| 2,409,462 | Zworykin et al. | Oct. 15, 1946 |
| 2,474,875 | White | July 5, 1949 |
| 2,483,644 | Kelsey et al. | Oct. 4, 1949 |
| 2,585,855 | Sherwin et al. | Feb. 12, 1952 |
| 2,653,186 | Hurford | Sept. 22, 1953 |